United States Patent
Kasai et al.

(10) Patent No.: US 8,446,801 B2
(45) Date of Patent: May 21, 2013

(54) READING APPARATUS, READING METHOD, PROGRAM, AND PROGRAM RECORDING MEDIUM

(75) Inventors: Koichi Kasai, Tokyo (JP); Satoshi Ikeda, Kanagawa (JP); Masaaki Isozaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 1395 days.

(21) Appl. No.: 11/622,491

(22) Filed: Jan. 12, 2007

(65) Prior Publication Data
US 2007/0165497 A1   Jul. 19, 2007

(30) Foreign Application Priority Data

Jan. 17, 2006   (JP) ................................ 2006-009081

(51) Int. Cl.
| | |
|---|---|
| G11B 21/08 | (2006.01) |
| G11B 5/09 | (2006.01) |
| G11B 5/86 | (2006.01) |
| G11B 19/02 | (2006.01) |
| G11B 27/00 | (2006.01) |
| G11B 27/36 | (2006.01) |

(52) U.S. Cl.
USPC ............ 369/30.27; 369/30.23; 369/47.1; 369/47.11; 369/47.23; 369/47.31; 369/53.1; 369/53.37

(58) Field of Classification Search
USPC .......... 369/30.27, 47.11, 47.31, 53.37, 30.23, 369/47.23, 47.1, 53.1; 386/265, 277, E5.07, 386/E5.072, 243, 282, E9.036; 348/E5.105; 360/15, 69
See application file for complete search history.

(56) References Cited

U.S. PATENT DOCUMENTS

| | | | | |
|---|---|---|---|---|
| 5,748,585 | A * | 5/1998 | Tsukamoto et al. | ........ 369/47.23 |
| 6,836,385 | B2 * | 12/2004 | Naohara et al. | .................. 360/15 |
| 7,161,878 | B2 * | 1/2007 | Yoshioka | ................... 369/47.11 |
| 2004/0013416 | A1 * | 1/2004 | Mok | ............................. 386/125 |
| 2004/0228618 | A1 | 11/2004 | Yoo et al. | |
| 2005/0271369 | A1 * | 12/2005 | Terai | ............................. 386/125 |
| 2006/0002261 | A1 * | 1/2006 | Fujita | ........................... 369/47.1 |

FOREIGN PATENT DOCUMENTS

| | | |
|---|---|---|
| JP | 09-161461 | 6/1997 |
| JP | 2003-244646 | 8/2003 |
| JP | 2003-296151 | 10/2003 |
| JP | 2004-178654 | 6/2004 |
| JP | 2006-514394 | 4/2006 |
| JP | 2006-523909 | 10/2006 |
| WO | WO 2004/088654 A1 | 10/2004 |
| WO | WO 2004/088655 A1 | 10/2004 |

* cited by examiner

Primary Examiner — Thai Tran
Assistant Examiner — Syed Hasan
(74) Attorney, Agent, or Firm — Oblon, Spivak, McClelland, Maier & Neustadt, L.L.P.

(57) ABSTRACT

A reading apparatus and method for reading data from a digital versatile disc includes a specification section configured to specify a predetermined position of content. A controller generates information indicating a predetermined portion from a position specified by the specification section. A storage section reads the predetermined portion from the digital versatile disc on the basis of the information generated by the generation section and stores the predetermined portion on a storage medium. A reading controller controls reading of data from the storage medium and the digital versatile disc.

20 Claims, 26 Drawing Sheets

| EXPANSION ATTRIBUTES | AREA INFORMATION (OFFSET/SIZE/FLAG) |
| --- | --- |
| | HINT INFORMATION (HINT OFFSET/HINT SIZE) |
| | CACHE FILE ID |

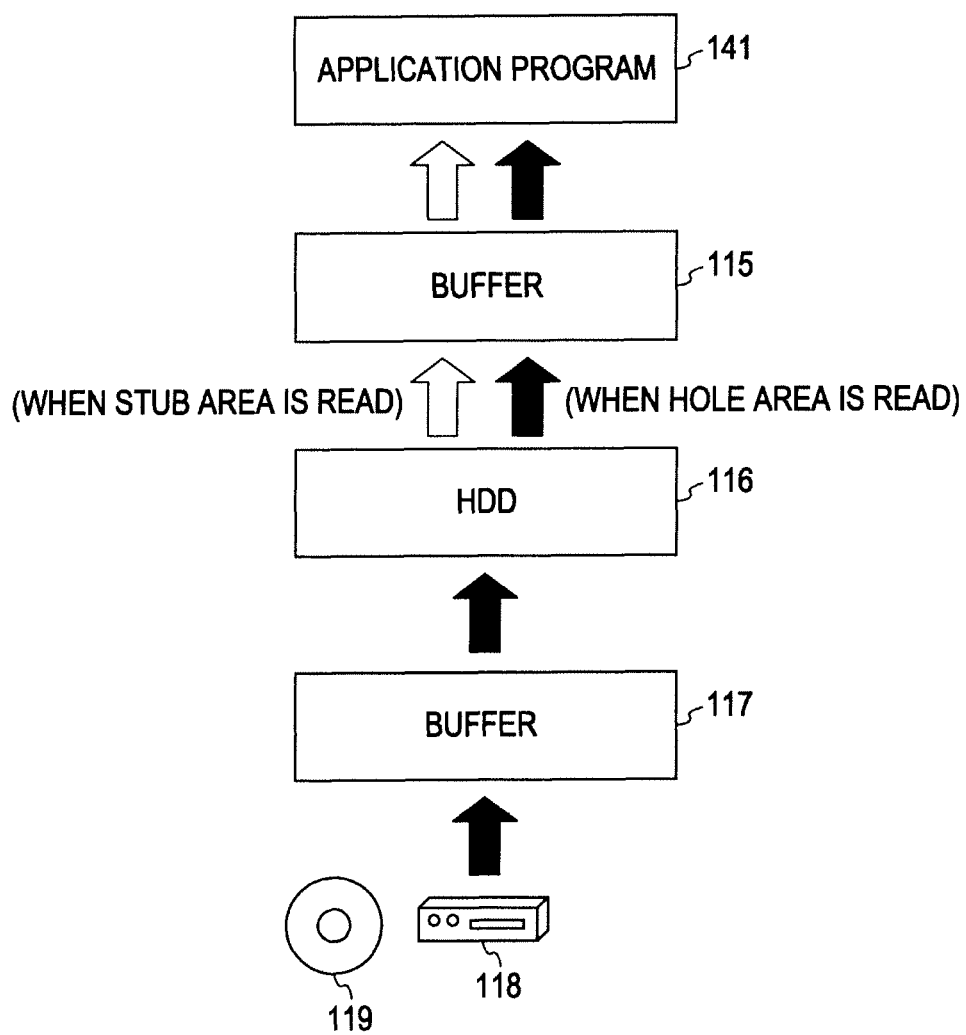

| PGC#1 |||||||
|---|---|---|---|---|---|---|
| PTT#1 ||||| PTT#2 ||
| PG#1 | PG#2 | PG#3 || PG#4 || PG#5 |
| Cell#1 | Cell#2 | Cell#3 | Cell#4 | Cell#5 | Cell#6 | Cell#7 | Cell#8 |

| PG NUMBER | ENTRY CELL NUMBER |
|---|---|
| PG#1 | 1 |
| PG#2 | 3 |
| PG#3 | 4 |
| ⋮ | ⋮ |
| PG#i | N |
| PG#i+1 | M |
| ⋮ | |

FIG. 15

| Cell#1 | Cell#2 | Cell#3 |
|---|---|---|
| VOBU#1 | VOBU#2 | VOBU#3 | VOBU#4 | VOBU#5 | VOBU#6 | VOBU#7 | VOBU#8 |

READING APPARATUS, READING METHOD, PROGRAM, AND PROGRAM RECORDING MEDIUM

CROSS REFERENCES TO RELATED APPLICATIONS

The present invention contains subject matter related to Japanese Patent Application JP 2006-009081 filed in the Japanese Patent Office on Jan. 17, 2006, the entire contents of which are incorporated herein by reference.

BACKGROUND OF THE INVENTION

1. Field of the Invention

The present invention relates to a reading apparatus, a reading method, a program, and a program recording medium. More particularly, the present invention relates to a reading apparatus for reading content, a reading method, a program, and a program recording medium.

2. Description of Related Art

FIG. 1 is a block diagram showing the configuration of a recording and playback system of related art.

A video/audio encoder 11 encodes image data of a baseband corresponding to an input image signal in accordance with the MPEG (Moving Pictures Experts Group) system. Furthermore, the video/audio encoder 11 encodes audio data of a baseband corresponding to an input audio signal (not shown) in accordance with the MPEG system. The video/audio encoder 11 supplies data obtained by the encoding to a stream encoder 12.

The stream encoder 12 multiplexes the encoded data, which is supplied from the video/audio encoder 11, converts the data into a stream by an MPEG transport stream method or an MPEG program stream method, and supplies the data stream obtained by the conversion to a write buffer 13.

The write buffer 13 temporarily stores the data stream supplied from the stream encoder 12 and supplies the stored data stream to a drive 14.

The drive 14 records the data supplied from the write buffer 13 onto a loaded optical disc 15. Furthermore, the drive 14 reads data that is recorded as a file from the loaded optical disc 15, and supplies the read data to a read buffer 19.

A juke system 16 controls loading and unloading of the optical disc 15 into and from the drive 14. The juke system 16 allows a picker 18 to select one of the optical discs 15 from disc slots 17 that store each of a plurality of optical discs 15.

Under the control of the juke system 16, the picker 18 transports the selected optical disc 15 and allows it to be loaded into the drive 14. Under the control of the juke system 16, the picker 18 transports the optical disc 15 taken out from the drive 14 and allows it to be stored in one of disc slots 17, that is, the juke system 16 controls the picker 18.

The read buffer 19 includes a semiconductor memory or a hard disk, and temporarily stores a data stream supplied from the drive 14. The read buffer 19 absorbs reading jitter, flattens the data rate so as to become constant, and supplies the stored data stream to a stream decoder 20.

The stream decoder 20 separates the data stream by the MPEG transport stream method or the MPEG program stream method into image data and audio data, and supplies the separated image data and audio data to a video/audio decoder 21.

The video/audio decoder 21 decodes the encoded image data and audio data into image data and audio data of a so-called baseband. Furthermore, the video/audio decoder 21 supplies, to a monitor 22, the output image signal and audio signal (not shown) based on the image data and audio data of the baseband, respectively, which are obtained by the decoding.

The monitor 22 displays an image on the basis of the output image signal and outputs audio on the basis of the supplied audio signal.

A description will now be given, with reference to FIG. 2, of a playback process of the recording and playback system. At time $t_0$, when playback is requested from a user, the optical disc 15 on which data of content for which playback is requested is transported by the picker 18 from the disc slot 17 to the drive 14. At time $t_1$, the optical disc 15 is loaded in the drive 14.

At time $t_2$, reading of data recorded on the loaded optical disc 15 is started, and the data is stored in the read buffer 19. At time $t_3$, when a predetermined amount of data is stored in the read buffer 19, the data stored in the read buffer 19 is read into the stream decoder 20. Then, the video/audio decoder 21 decodes the image data and the audio data, and supplies an output image signal and an output audio signal corresponding to the image data and the audio data obtained by the decoding to the monitor 22. At time $t_4$, on the basis of the output image signal and the output audio signal, the monitor 22 displays an image and outputs audio.

That is, from when playback is requested from the user at time $t_0$ until an image is displayed on the monitor 22 at time $t_4$, a time lag corresponding to the period of time necessary from when the optical disc 15 stored in the disc slot 17 is loaded into the drive 14 until image data is read from the loaded optical disc 15 occurs. This time lag is approximately 20 to 30 seconds depending on the configuration of the recording and playback system.

This time lag occurs each time playback is requested. As a consequence, the user may feel very anxious. This point is a serious problem from the viewpoint of ease of operation.

Accordingly, in the related art, there has been developed a video recording and playback apparatus for recording or reproducing a video and/or audio signal onto or from a first recording medium; a second recording medium having an access time shorter than that of the first recording medium and into or from which a signal from the beginning portion of the video and/or analog signal up to a predetermined period of time is recorded or reproduced when a desired video and/or analog signal is recorded into or from the first recording medium; and a control for controlling the recording and playback means and the second recording medium (for example, refer to Japanese Unexamined Patent Application Publication No. 1997-161461).

SUMMARY OF THE INVENTION

The present inventors, however recognized that, also, when playback of content is to be started from the middle of the content, a similar time lag occurs. If this time lag can be shortened, it is possible to provide a playback function having a high degree of ease of operation. This ease of operation is particularly important in a DVD (Digital Versatile Disc) capable of performing playback from a position specified by a resume playback function and by a bookmarking function.

The present invention has been made in view of such and other circumstances, and recognized it is desirable to reduce a wait time when a specified portion of a DVD is to be read during the playback of the DVD.

According to an embodiment of the present invention, a reading apparatus for reading data from a digital versatile disc includes: specification means for specifying a predetermined position of content; generation means for generating information indicating a predetermined portion from a position specified by the specification means; storage means for reading the predetermined portion from the digital versatile disc on the basis of the information generated by the generation means and for storing the predetermined portion on a storage medium; and reading control means for controlling reading of data from the storage medium and the digital versatile disc so that the data of the predetermined portion from the position specified by the specification means, the predetermined portion being stored on the storage medium, is read and data subsequent to the data read from the storage medium is read from the digital versatile disc if reading of the content from the position specified by the specification means is requested.

The predetermined portion from the position specified by the specification means may be a portion of a period of time longer than a period of time necessary for reading data of content from the digital versatile disc.

The specification means may specify a resume-stopped position or a bookmarked position as the predetermined position.

Further, the predetermined portion may be detected utilizing navigation information on the digital versatile disc.

Further, when storing the data on the storage medium, the navigation information may be converted into offset values from a beginning of a file of the data.

According to another embodiment of the present invention, a reading method for use with a reading apparatus for reading data from a digital versatile disc, or a program for enabling a computer to perform a reading process for reading data from a digital versatile disc, include specifying a predetermined position of content; generating information indicating a predetermined portion from the position specified in the specification; reading the predetermined portion from the digital versatile disc on the basis of the information generated in the generation and storing the predetermined portion in advance on a storage medium; and controlling reading of data from the storage medium and the digital versatile disc so that the data of the predetermined portion from the position specified in the specification, the predetermined portion being stored on the storage medium, is read and data subsequent to the data read from the storage medium is read from the digital versatile disc if reading of the content from the position specified in the specification is requested.

As described above, according to an embodiment of the present invention, it is possible to reduce a wait time when a specified portion of a DVD is to be played during the playback of the DVD.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 8 illustrates reading of data of content by using a cache file;

FIG. 13 illustrates VTSI;

FIG. 14 illustrates PGC_PGMAP of FIG. 13;

FIG. 15 illustrates the structure of cells;

DESCRIPTION OF THE PREFERRED EMBODIMENTS

Before describing an embodiment of the present invention, the correspondence between the features of the claims and the specific elements disclosed in an embodiment of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

A reading apparatus (for example, a recording and playback system 101 of FIG. 4) for reading data from a digital versatile disc (DVD) or a storage medium according to an embodiment of the present invention includes: specification means (for example, an application program 141 of FIG. 4) for specifying a predetermined position of content; generation means (for example, a migration file system 164 of FIG. 4) for generating information indicating a predetermined portion from a position specified by the specification means, the predetermined portion being stored in advance on the storage medium, on the basis of navigation information of the DVD on which the content is recorded; storage means (for example, a storage manager 114 of FIG. 4) for reading the predetermined portion from the DVD on the basis of the information generated by the generation means and for storing the predetermined portion on the storage medium; and reading control means (for example, a storage manager 114 of FIG. 4) for controlling reading of data from the storage medium and the DVD so that the data of the predetermined portion from the position specified by the specification means, the predetermined portion being stored on the storage medium, is read and data subsequent to the data read from the storage medium is read from the DVD if reading of the content from the position specified by the specification means is requested.

The predetermined portion from the position specified by the specification means may be a portion of a period of time longer than a period of time (for example, time T) necessary for reading data of content from the DVD.

Figure 7A:
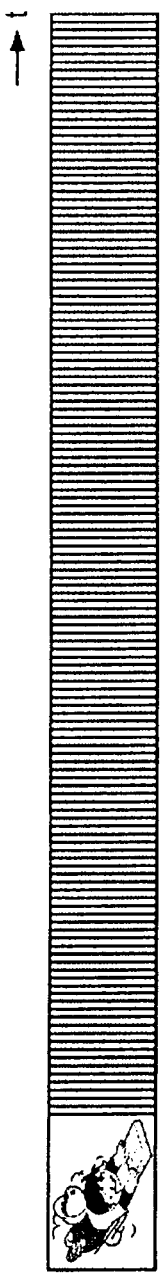
FIGS. 7A, 7B, and 7C show a cache file recorded in an HDD.
Figure 7B:
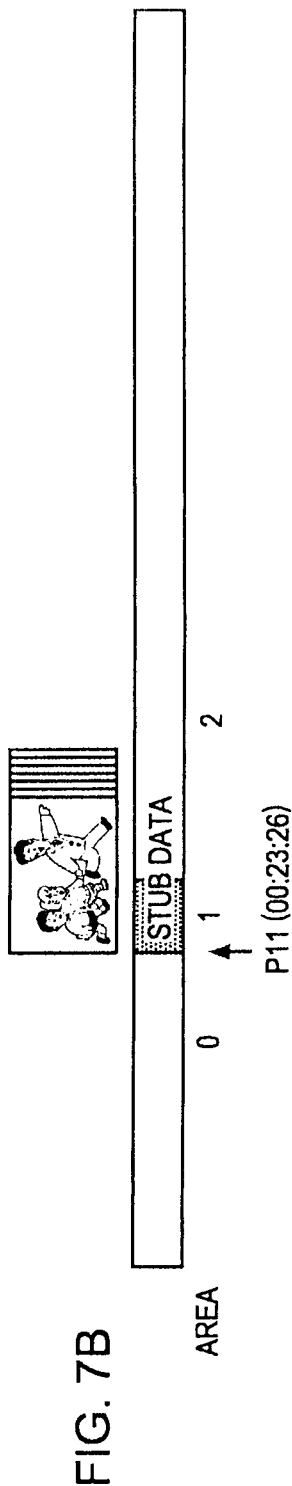
Figure 7C:
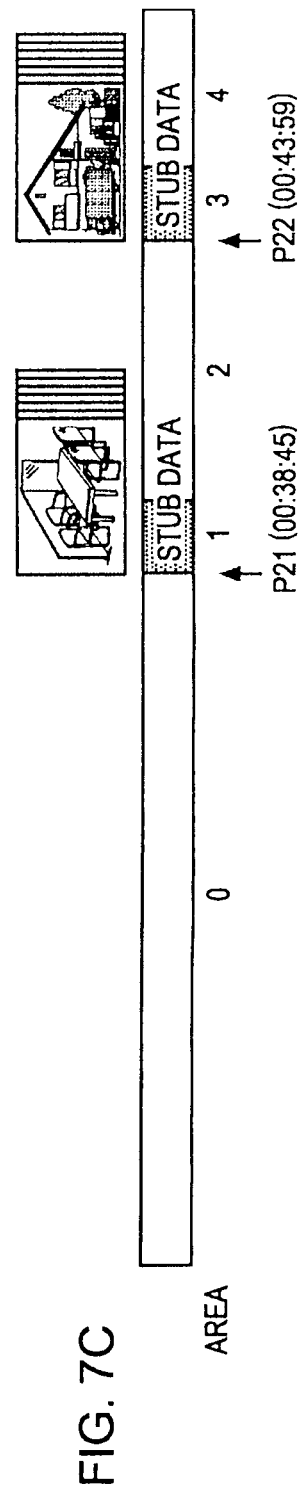

The specification means may specify a resume-stopped position or a bookmarked position as the predetermined position (for example, a position P11 of FIG. 7B, or a position P21 or P22 of FIG. 7C).

A reading method for use with a reading apparatus for reading data from a DVD or a storage medium or a program for enabling a computer to perform a reading process for reading data from a DVD or a storage medium according to another embodiment of the present invention includes: specifying (for example, step S1 of FIG. 17) a predetermined position of content; generating (for example, step S2 of FIG. 17) information indicating a predetermined portion from the position specified in the specification, the predetermined portion being stored in advance on the storage medium, on the basis of navigation information of the DVD on which the content is recorded; reading (for example, step S3 of FIG. 17) the predetermined portion from the DVD on the basis of the information generated in the generation and storing the predetermined portion in advance on the storage medium; and controlling (for example, step S72 or step S73 of FIG. 26) reading of data from the DVD and the storage medium so that the data of the predetermined portion stored on the storage medium is read and data subsequent to the data read from the storage medium is read from the DVD if reading of the data of the content is requested.

Figure 1:
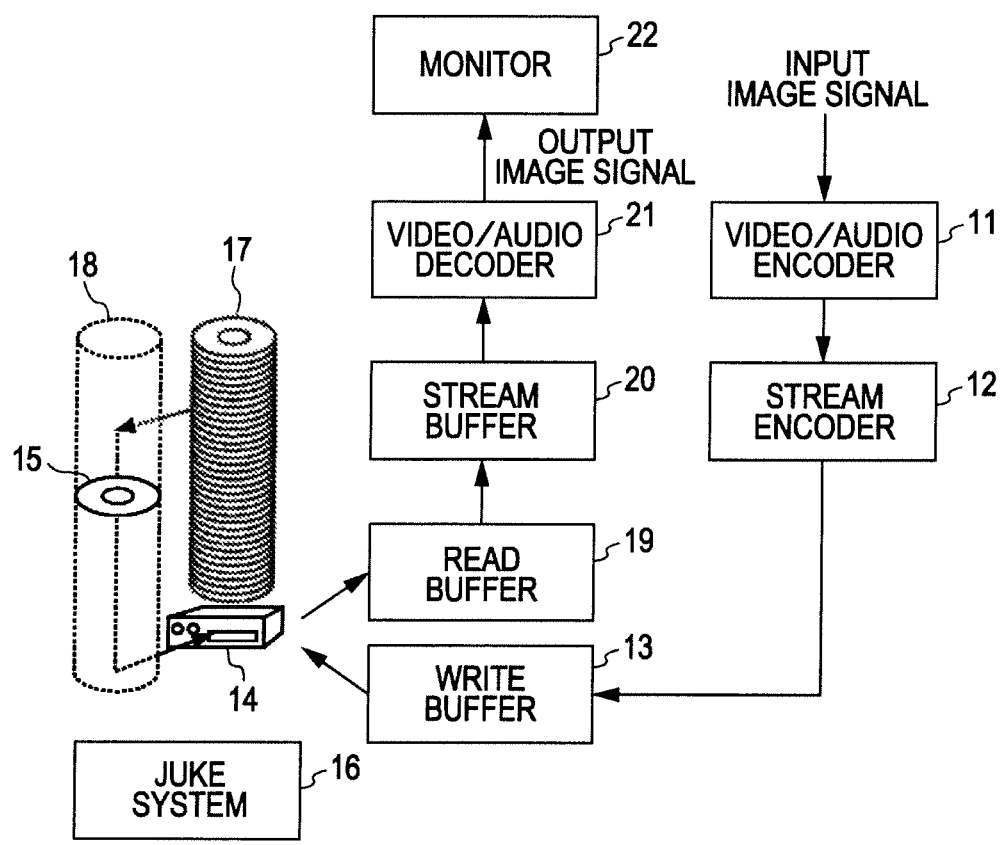
FIG. 1 is a block diagram showing the configuration of a recording and playback system of the related art.
Figure 2:
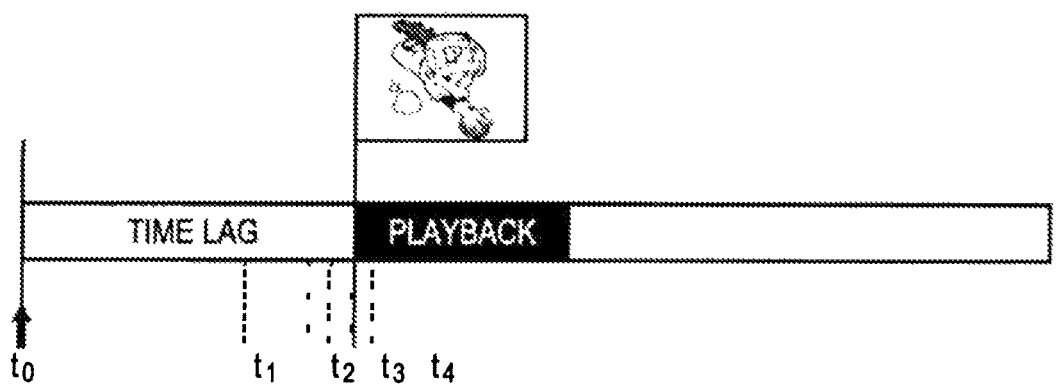
FIG. 2 illustrates a recording method of the related art.
Figure 3:
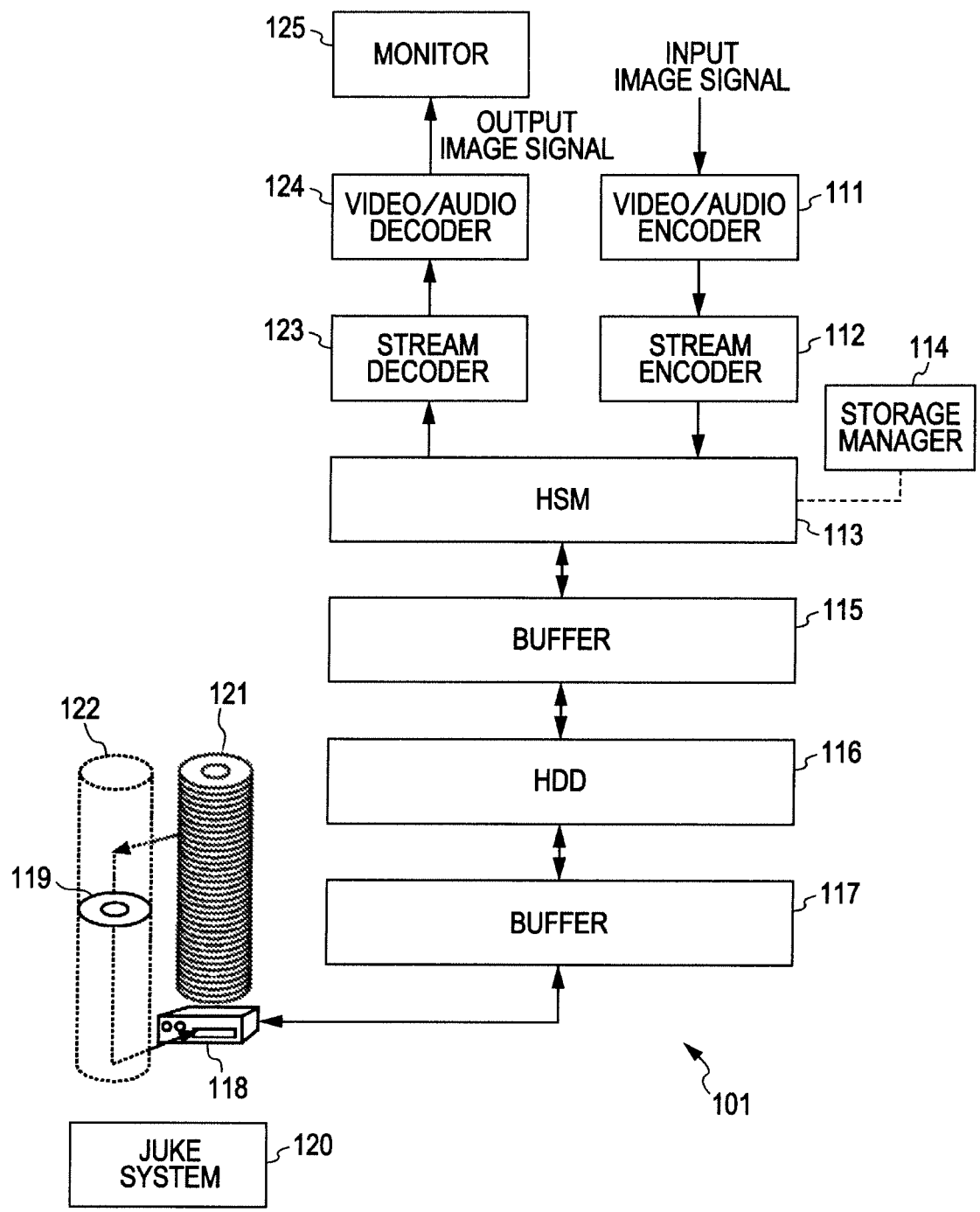
FIG. 3 is a block diagram showing an example of the configuration of a recording and playback system according to an embodiment of the present invention.

FIG. 3 shows the configuration of a recording and playback system 101 according to an embodiment of the present invention.

A video/audio encoder 111 encodes image data of a baseband corresponding to an input image signal in accordance with the MPEG system. Furthermore, the video/audio encoder 111 encodes audio data of a baseband corresponding to the input audio signal (not shown) in accordance with the MPEG system. The video/audio encoder 111 supplies the data obtained by the encoding to a stream encoder 112.

The stream encoder 112 multiplexes the encoded data, which is supplied from the video/audio encoder 111, converts the data into a stream by an MPEG transport stream method or an MPEG program stream method, and supplies the stream obtained by the conversion to an HSM (Hierarchical Storage Management) 113.

The HSM 113 manages hierarchical storage of data of content onto a storage medium (that is, storage of data of content onto a storage medium having a hierarchical structure is managed).

Under the control of a storage manager 114, the HSM 113 supplies the stream supplied from the stream encoder 112 to an HDD (Hard Disk Drive) 116 via a buffer 115.

The HSM 113 reads, from the HDD 116, the data stream that is read from an optical disc 119 and that is stored in the HDD 116 via the buffer 115, and supplies the read data stream to a stream decoder 123.

The HDD 116 is an example of a high-speed primary storage device, and stores a data stream supplied from the HSM 113 via the buffer 115 under the control of the HSM 113. Furthermore, the HDD 116 supplies the stored data stream to the buffer 115 or a buffer 117.

The buffer 115 is formed of a semiconductor memory, a portion of the HDD 116, or the like. The buffer 115 temporarily stores the data stream supplied from the HSM 113 or the HDD 116, and supplies the stored data stream to the HSM 113 or the HDD 116.

The buffer 117 is formed of a semiconductor memory, a portion of the HDD 116, or the like. The buffer 117 temporarily stores a data stream supplied from the HDD 116 or a drive 118 and supplies the stored data stream to the HDD 116 or the drive 118.

The buffer 115 and the buffer 117 absorb reading jitter and flatten the data rate so as to become constant.

The drive 118 records the data supplied from the buffer 117 as a file on a loaded optical disc 119.

The drive 118 reads the data recorded as a file from the loaded optical disc 119 and supplies the data to the buffer 117.

A juke system 120 controls loading and unloading of the optical disc 119 to and from the drive 118. Furthermore, the juke system 120 allows a picker 122 to select one of the optical discs 119 from disc slots 121 used for storing each of the optical discs 119.

Under the control of the juke system 120, the picker 122 transports the selected optical disc 119 and allows it to be loaded in the drive 118. Furthermore, under the control of the juke system 120, the picker 122 transports the optical disc 119 taken out from the drive 118 and allows it to be stored in one of the disc slots 121. That is, the juke system 120 controls the picker 122.

The stream decoder 123 separates a data stream by an MPEG transport stream method or an MPEG program stream method into image data and audio data, and supplies the separated image data and audio data to a video/audio decoder 124.

The video/audio decoder 124 decodes the encoded image data and audio data to image data and audio data of a so-called baseband. Furthermore, the video/audio decoder 124 supplies, to a monitor 125, an output image signal and an output audio signal (not shown), which are respectively based on the image data and the audio data of the baseband obtained by the decoding.

The monitor 125 displays an image on the basis of the output image signal and outputs audio on the basis of the output audio signal.

Figure 4:
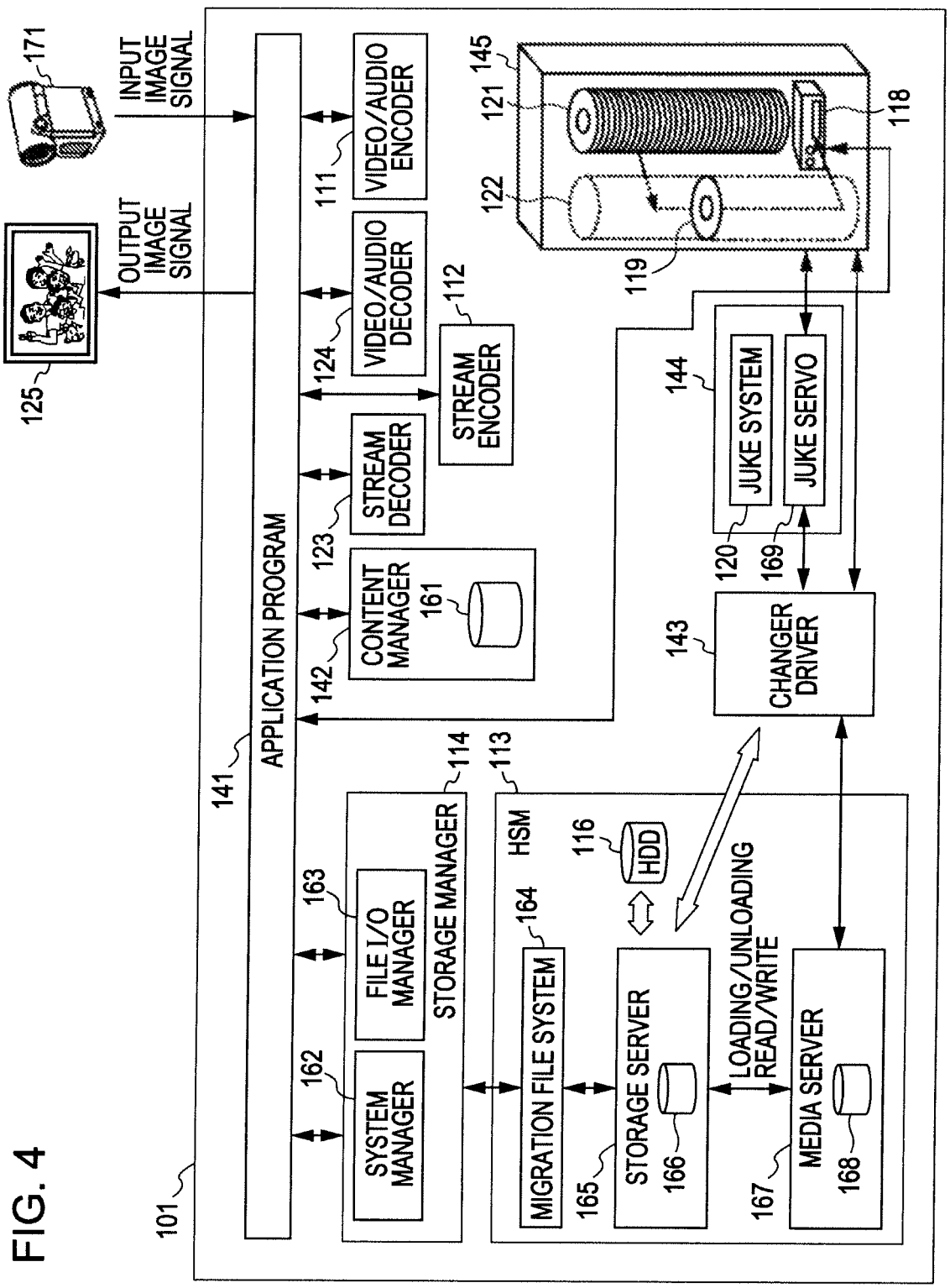
FIG. 4 is a block diagram showing a more detailed configuration of the recording and playback system.

FIG. 4 is a block diagram showing a more detailed configuration of the recording and playback system 101 of the portion according to an embodiment of the present invention.

An application program 141 has an interface function with a user, and obtains instructions from the user or notifies the user of various kinds of information on the recording and playback system 101. The application program 141 controls the entire recording and playback system 101.

A content manager 142 manages descriptions of the content recorded by the recording and playback system 101 and searches through the descriptions of the content.

The content manager 142 controls recording of various kinds of information on content into a content database 161, and controls reading of information on content from the content database 161.

Various kinds of information on the content recorded in the content database 161 are as follows, for example:

Information (for example, file names, path names, etc.) of files associated with content Descriptions of content and additional information (for example, names of content, genres of content, etc.)

Compression format (method) of content, playback time, and index information (for example, index positions in content, etc.)

User information (for example, names of users, the passwords, etc.) of users having access authorization The storage manager 114 controls the HSM 113 on the basis of a request from the application program 141.

The storage manager 114 is provided with a system manager 162 and a file I/O manager 163.

The system manager 162 sets a storage-control-related system, records an error log, and performs a maintenance process.

The file I/O manager 163 controls a process (a reloading process to be described later) for reading data from the optical disc 119 to the HDD 116 or a process for writing data from the HDD 116 to the optical disc 119.

The HSM 113 forms, as a virtual storage, the HDD 116, the drive 118, the optical disc 119, the juke system 120, the disc slot 121, and the picker 122, and controls temporary storage of data of content by the HDD 116.

The HSM 113 is configured to include a migration file system 164, a storage server 165, a store database (DB) 166, a medium server 167, and a volume database (DB) 168.

Figures 5, 6:
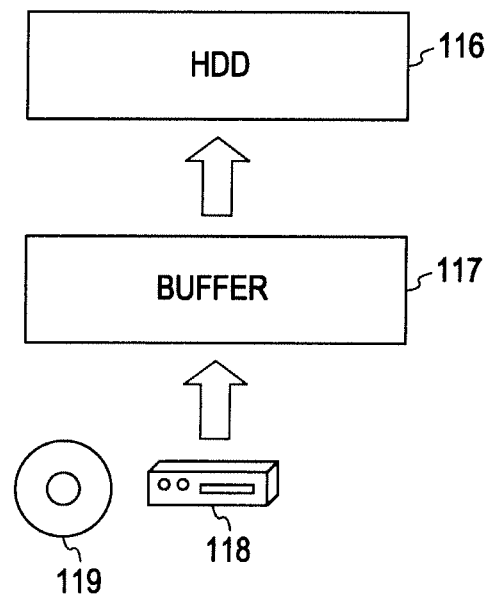
FIG. 5 shows expansion attributes.
FIG. 6 illustrates a cache file recorded in an HDD.

As shown in FIG. 5, the migration file system 164 manages area information of a portion of content stored as a cache file in the HDD 116, hint information indicating a hint as to which portion of the content should be stored as a cache file in the HDD 116, and expansion attributes, such as the cache file ID.

The area information includes an offset indicating an offset value (bytes) from the beginning of the data of the content up to the beginning of the portion of the content stored as a cache file in the HDD 116, the size indicating the amount of data of the portion, a flag indicating whether only a portion has been stored or if stored in a hole state (described later), and the like.

The hint information includes a hint offset indicating an offset value (bytes) from the beginning of the data of content up to the beginning of the portion of the content to be stored as a cache file in the HDD 116, a hint size indicating the amount of data of the portion, and the like.

Area flags indicating attributes of a portion to be stored in the HDD 116, a hint priority indicating a priority when the portion is to be migrated, and the like, may be contained in the hint information.

The expansion attributes of the content may be stored or read by the file system of the operating system, or may be stored in the content database 161.

Referring back to FIG. 4, the migration file system 164 manages access events for files managed by the HSM 113.

The storage server 165 reads data from the optical disc 119 into the HDD 116, or writes data from the HDD 116 to the optical disc 119.

Furthermore, the storage server 165 manages recording, into the store database 166, information on a cache file for storing data of content stored in the HDD 116, or manages reading of information on a cache file from the store database 166.

The information on the cache file 166 to be recorded in the store database 166 is as follows, for example:
Information by which cache file names stored in the HDD 116 and cache file IDs, which are values for specifying cache files, are associated with one another
Cache file date information indicating time when a cache file was written or when a cache file was last accessed
Volume ID for specifying the optical disc 119 on which the whole data is stored
Available capacity of each optical disc 119 in the jukebox 145

The medium server 167 manages the optical disc 119 stored in each disc slot 121.

The medium server 167 requests a changer driver 143 to load the specified optical disc 119 into the drive 118.

Furthermore, the medium server 167 requests the changer driver 143 to unload, to the disc slot 121, the optical disc 119 loaded into the drive 118.

The volume database 168 provided in the medium server 167 stores information on the optical disc 119.

Information on the optical disc 119, which is stored in the volume database 168, is as follows, for example:
Recording capacity of the disc 119 in a raw disc state
Type as medium of each disc 119 (MO (Magneto-Optical disk), DVD (Digital Versatile Disc)+R, DVD+RW, and the like), and attributes, such as write-only or readable-writable
Volume ID of the optical disc 119 stored in each disc slot 121 in the jukebox 145
Use state of the drive 118 incorporated in the jukebox 145

The changer driver 143 controls the drive 118, and has an interface function to and from the jukebox control section 144 and the HSM 113.

The jukebox control section 144 includes the juke system 120 and a juke servo 169. The juke system 120 controls the system including the drive 118, the optical disc 119, the disc slot 121, and the picker 122. The juke servo 169 drives the jukebox 145.

The jukebox 145 includes the drive 118, the optical disc 119, the disc slot 121, and the picker 122.

Next, the outline of the embodiment of the present invention will be described below. According to the embodiment of the present invention, when a specified portion of a DVD serving as the optical disc 119 is to be read, a wait time can be reduced.

In the embodiment of the present invention, when the DVD 119 loaded into the drive 118 is being played back, for example, if a resume stopping operation or a bookmarking operation is performed by the user, on the basis of navigation information in the DVD-Video standard, which is read from the DVD 119 by the drive 118, hint information (FIG. 5) indicating the position corresponding to the resume stopping operation or the bookmarking operation is generated. Then, on the basis of the hint information, as shown in FIG. 6, data of the predetermined period of time from the position is read from the drive 118 into which the DVD 119 is loaded. The read data is supplied to the HDD 116 via the buffer 117, whereby it is written in advance as a cache file in (the cache area of) the HDD 116.

The resume playback function is a function for starting playback from the position where the playback was last stopped (resume stopped) at the next playback time. The bookmarking function is a function capable of, by specifying favorites scenes, playing back the scenes afterwards (locating the start and playing back).

FIG. 7B shows the state of the cache file of the HDD 116, which is generated by a resume stopping operation for the DVD 119 on which content shown in FIG. 7A is recorded.

In the example of FIG. 7B, a "resume stop" function is performed at a position P11 after an elapse of 23 minutes and 26 seconds from the start of the content, and data of a predetermined period of time from the position is stored as a cache file in the HDD 116.

FIG. 7C shows the state of the cache file of the HDD 116, which is generated by a bookmarking operation for the DVD 119 on which content shown in FIG. 7A is recorded.

In the example of FIG. 7C, a position P21 after an elapse of 38 minutes and 45 seconds from the start of the content, and a position P22 after an elapse of 43 minutes and 59 seconds from the start of the content, are bookmarked. Data of a predetermined period of time from those positions is stored as cache files in the HDD 116.

Here, the portion of content corresponding to the data stored as a cache file in the cache area of the HDD 116 will be referred to as a "stub", and the area in the content, in which the stub data is stored in the HDD 116, will be referred to as a "stub area". Furthermore, the area in the content, in which the stub data is not stored in the HDD 116, will be referred to as a "hole area". When the stub area and the hole area need not be distinguished from each other, they will be simply referred to as an "area".

That is, in the example of FIG. 7B, the data (stub data) in an area, which is a stub area indicated by 1 of the content, is stored as a cache file in the HDD 116, and the data in areas, which are hole areas indicated by 0 and 2 of the content, is not stored in the HDD 116.

In the example of FIG. 7C, the data (stub data) in stub areas indicated by 1 and 3 of the content is stored as cache files in the HDD 116. The data in hole areas indicated by 0, 2, and 4 of the content is not stored in the HDD 116.

As described above, when a resume stopping operation or a bookmarking operation is performed, data of a predetermined period of time from the position at which the resume stopping or bookmarking operation has been performed is written as a cache file into (the cache area of) the HDD 116.

As indicated by the white-on-black arrows in FIG. 8, the data of the DVD 119, which is stored as a cache file in the HDD 116, is read by the application program 141 from the HDD 116 via the buffer 115. On the other hand, as indicated by the black arrows in FIG. 8, the data of the DVD 119, which is not stored in the HDD 116, is read from the drive 118 into which the DVD 119 is loaded. Then, the data read from the drive 118 is, for example, supplied to the HDD 116 via the buffer 117, whereby the data is stored as a cache file and is read via the buffer 115 by the application program 141.

Therefore, in the embodiment of the present invention, as indicated by the white-on-black arrows in FIG. 8, when playback from the resume-stopped or bookmarked position the DVD 119 is to be performed, first, the data in a portion at the position specified from the cache file that is prestored in the HDD 116 is read and supplied to the application program 141 via the buffer 115. Then, as indicated by the black arrows in FIG. 8, the data in the hole area is read from the drive 118 into which the DVD 119 is loaded while the data of the portion is being read and before data subsequent to the data that is not prestored in the cache file is read. The data is then stored as a cache file in the HDD 116. Then, the data in the hole area is read from the cache file and is supplied to the application program 141 via the buffer 115.

That is, according to the embodiment of the present invention, the drive 118 reads data from the DVD 119 at a speed higher than the reading speed of data necessary for playing back content. Therefore, by lengthening the period of time from the specified position at which the data is stored as a cache file to be longer than the period of time necessary for reading the data of the content from the DVD 119, the data that is not stored in the cache file of the HDD 116 can be stored in the cache file of the HDD 116 before the data is read for playing back content. As a consequence, the data necessary for playing back content can typically be read from the cache file of the HDD 116. When a request for reading the data of the content is made, it is possible to quickly read the data of the content without hardly causing a wait time to occur. That is, for example, in the case of audio or image content, the image or audio can be played back without the image and audio being interrupted.

Next, details of the embodiment of the present invention will be described below.

The DVD-Video standard will be described first.

Figures 9, 10:
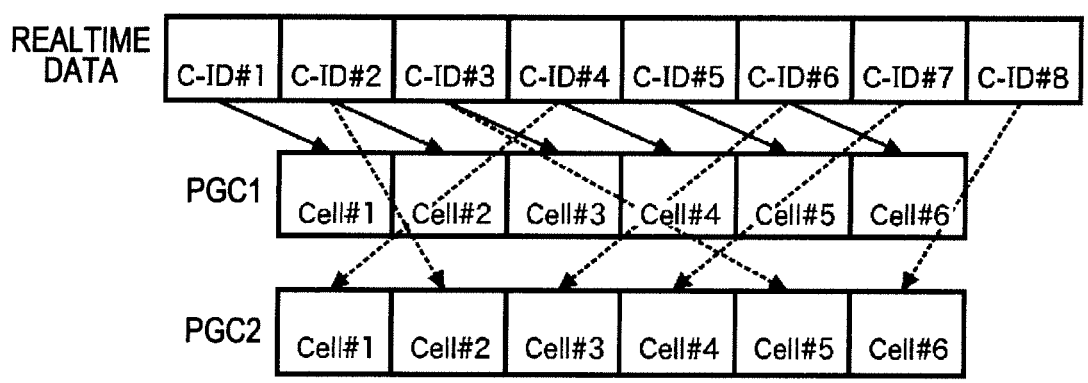
FIG. 9 shows the data structure of the DVD-Video standard.
FIG. 10 illustrates numbers assigned to cells.

FIG. 9 shows the data structure of the DVD-Video standard.

A PGC (Program Chain) specifies the order in which cells are played back. In FIG. 9, PGC# indicates the PGC number.

A group of one or more cells having consecutive numbers in the PGC is defined as one program (PG). The program is used as the unit of random shuffle playback and the unit of access by a command. In FIG. 9, PG# indicates the program number.

A group of one or more programs having consecutive numbers in the PGC is defined as one PTT. The PTT corresponds to a chapter and is one of the units of access by a user. In FIG. 9, PTT# indicates the PTT number.

A cell is a unit at which real-time data is played back, and a cell number (Cell#1, Cell#2, . . . in FIG. 10) is assigned to each cell in the order of playback within one PGC. Furthermore, as shown in FIG. 10, a unique ID number (C-ID #1, C-ID #2, . . . in FIG. 10) is also assigned to each cell.

Each cell is formed of a plurality of VOBUs (Video Object Units), which is a set of video objects composed of data, such as video, audio, and subpictures.

Next, the file structure of the DVD-Video standard will be described below.

Figure 11:
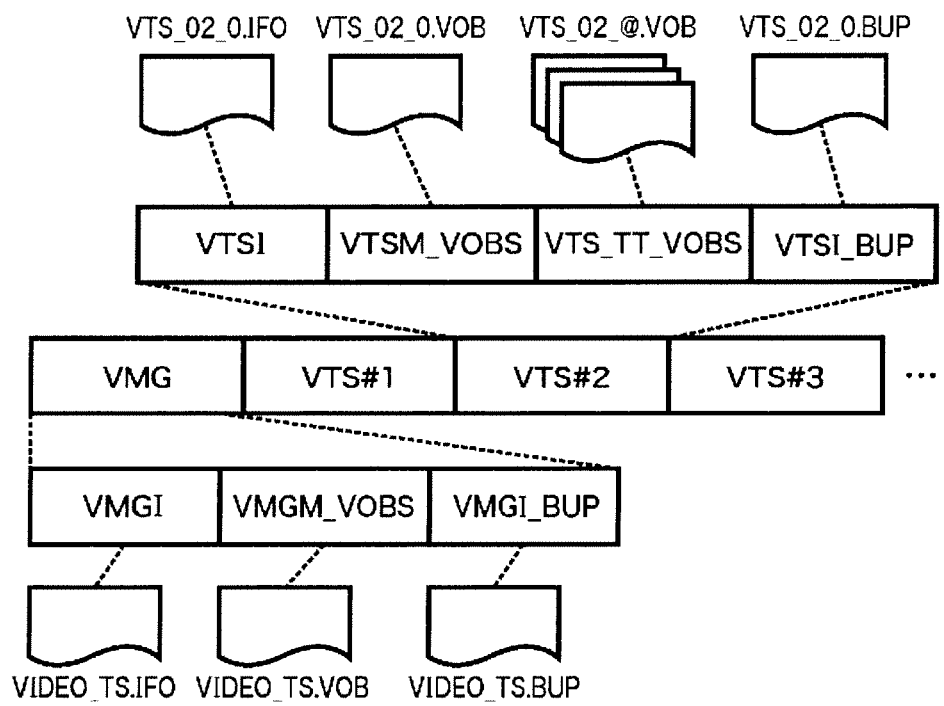
FIG. 11 shows the file structure of the DVD-Video standard.

In the DVD-Video standard, a single DVD video zone is provided. As shown in FIG. 11, the DVD video zone includes one VMG and at least one to a maximum of 99 VTSs (Video Title Sets).

The VMG (Video Manager) is formed of VMGI, VMGM_VOBS, and VMGI_BUP.

The VMGI (Video Manager Information) is control information for the entire DVD video data and is formed of one VIDEO_TS.IFO file.

The VMGM_VOBS (VOBS for VMG menu) contains content for the title selection menu, such as video, audio, and the like of the title menu, and is formed of one VIDEO_TS.VOB file.

The VMGI_BUP (control data for backup) is a copy (backup) of the VMGI and is formed of one VIDEO_TS.BUP file.

Each VTS (Video Title Set) is formed of VTSI, VTSM_VOBS, VTS_TT_VOBS, and VTSI_BUP.

The VTSI (Video Title Set Information) is control information for the VTS of one or more titles, information of the VTS menu, and the like, and is formed of one VTS_##_0.IFO file. ## (02 in FIG. 11) indicates an integer of 01 to 99.

The VTSM_VOBS (VOBS for VTS menu) indicates content for various kinds of menus in the VTS, such as a chapter image, audio, and a subtitles selection image, and is formed of one VTS_##_0.VOB file.

The VTS_TT_VOBS (VOBS for titles in the VTS) contains content for reproducing a title and is formed of a plurality of files of VTS_##_@.VOB. @ indicates an integer from 1 to 9.

The VTSI_BUP (control data for backup) is a copy (backup) of VTSI and is formed of one VTS_##_0.BUP file.

Next, details of main files will be described below.

First, the VMGI (VIDEO_TS.IFO) of the VMG will be described.

Figure 12:
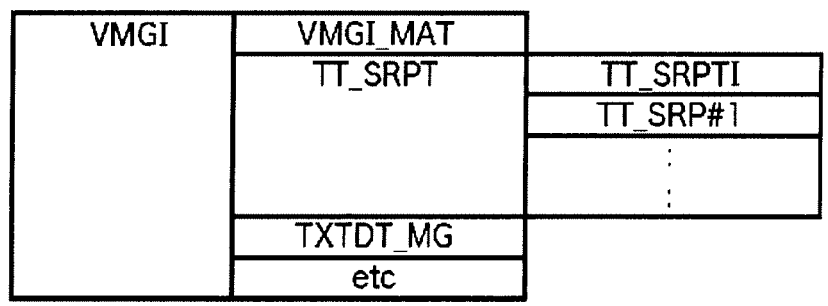
FIG. 12 illustrates VMGI.

As shown in FIG. 12, the VMGI is formed of VMGI_MAT, TT_SRPT, TXTDT_MG, and the like.

In the VMGI_MAT (Video Manager Information Management Table), for example, the sizes of the VMG and the VMGI, the beginning address of each piece of information (TT_SRPT, etc.) in the VMG, the attribute information of the VOB for the VMGM, and the like, are described.

In the TT_SRPT (Title Search Pointer Table), search information of titles in the content of DVD video is described. The search information is formed of TT_SRPTI and a plurality of TT_SRPs.

In the TT_SRPTI, for example, the number of TT_SRPs (titles) and the end address of the TT_SRPT are described.

The TT_SRP is provided for each title. In the TT_SRP, for example, the number (VTSN) of the VTS to which the titles described below belong to, the title number (VTS_TTN) in the VTS, and furthermore the angles, the number of PTTs, the VTS address, and the like are described:

Title #1: VTSN=1 VTS_TTN=1
Title #2: VTSN=2 VTS_TTN=1
Title #3: VTSN=2 VTS_TTN=2
Title #4: VTSN=3 VTS_TTN=1

In the TXTDT_MG, text information, such as the name provided to the disc and the title, is described.

Next, the VTSI (VTS_##_0.IFO) of the VTS will be described below.

Figure 13:
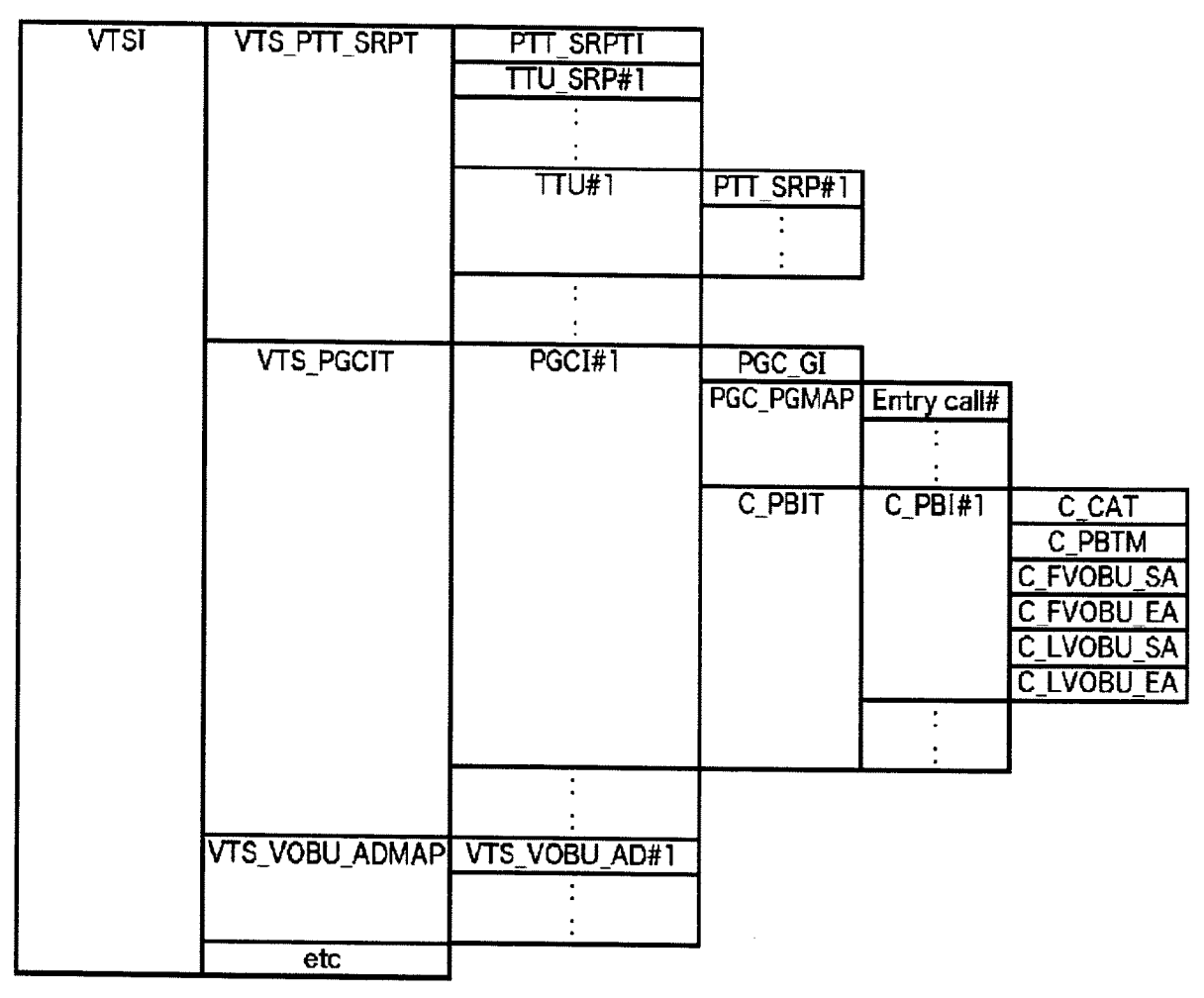

As shown in FIG. 13, the VTSI is formed of VTS_PTT_SRPT, VTS_PGCIT, VTS_VOBU_ADMAP, and the like.

The VTS_PTT_SRPT (VTS PTT Search Pointer Table) is a table for indicating which PG of which PGC each PTT corresponds to. In the table, the PGCI numbers necessary for reproducing VTS_TTN are described.

The VTS_PTT_SRPT is formed of PTT_SRPTI, a plurality of TTU_SRPs, and a plurality of TTUs.

In the PTT_SRPTI, the TTU number and the end address of the VTS_PTT_SRPT are described.

In each TTU_SRP, the number of relative bytes from the beginning of the VTS_PTT_SRPT at the beginning address of the TTU is described.

The TTU is a set of PTT_SRPs for each title and indicates which PTT each title is formed of.

The VTS_PGCIT (VTS Program Chain Information Table) is a group of tables in which information of all the PGCs belonging to the VTS is described, and contains a plurality of PGCIs.

The PGCI (Program Chain Information) is a set of navigation data for controlling the playback of the PGC.

The PGCI is formed of PGC_GI, PGC_PGMAP, and C_PBIT.

In the PGC_GI (PGC General Information), the overall information on the total number of programs (PGs) in the PGC, the total number of cells, the PGC playback time, and the start addresses of various kinds of tables for the PGC is described.

The PGC_PGMAP (PGC Program Map) is a map table indicating the structure of programs in the PGC. In the map table, as shown in FIG. 14, the cell number of the cell to be played back first (hereinafter referred to as an "entry cell") with respect to each program is described.

FIG. 14 corresponds to the data structure shown in FIG. 9, also showing that the program of the PG#1 starts from the cell of the Cell#1, the program of the PG#2 starts from the cell of the Cell#3, and the program of the PG#3 starts from the cell of the Cell#4.

Referring back to FIG. 13, the C_PBIT (Cell Playback Information Table) is a table that has, as elements, C_PBI for defining the order in which the files in the PGC are reproduced.

The C_PBI (Cell Playback Information) is formed of C_CAT, C_PBTM, C_FVOBU_SA, C_FVOBU_EA, C_LVOBU_SA, and C_LVOBU_EA.

In the C_CAT, cell categories, such as the type of cell, a seamless playback flag, an STC, a discontinuity flag, an access limit flag, a still time, a cell command number, and the like, are described.

In the C_PBTM, a cell playback time is described.

In the C_FVOBU_SA, the beginning address of the beginning VOBU of the cell is described. In the C_FVOBU_EA, the end address of the beginning VOBU of the cell is described.

In the C_LVOBU_SA, the beginning address of the end VOBU of the cell is described. In the C_LVOBU_EA, the end address of the end VOBU of the cell is described.

In the VTS_VOBU_ADMAP (VTS VOBU Address Map), an address for specifying a location at which the data of the VOBU about the VTSI is recorded is described. More specifically, in the manner described below, the beginning addresses of the VOBUs (#1 to #m) belonging to the VTSI are described in ascending order of the LBN (logical block number) thereof. One sector=2048 bytes.

VOBU(VTS_VOBU_AD) #1: address 000 sector
VOBU(VTS_VOBU_AD) #2: address 100 sector
VOBU(VTS_VOBU_AD) #3: address 200 sector
VOBU(VTS_VOBU_AD) #4: address 400 sector That is, the VTS_VOBU_AD #n (VTS VOBU #n Address) indicates the beginning address of the n-th VOBU in the VTS_VOBU_ADMAP.

The VTSI (VTS_##_0.IFO) is structured in the manner described above. If the information described therein is used, in the case of the data structure shown in, for example, FIG. 15, the start address of the VOBU#3 to be played back first in the cell of the Cell #2 can be known by referring to the C_FVOBU_SA of the C_PBI #2. Furthermore, by referring to the VTS_VOBU_ADMAP on the basis of the start address of the VOBU#3, it is possible to know the sequential position of the VOBU#3 among the VOBUs belonging to the VTSI.

Figure 16:
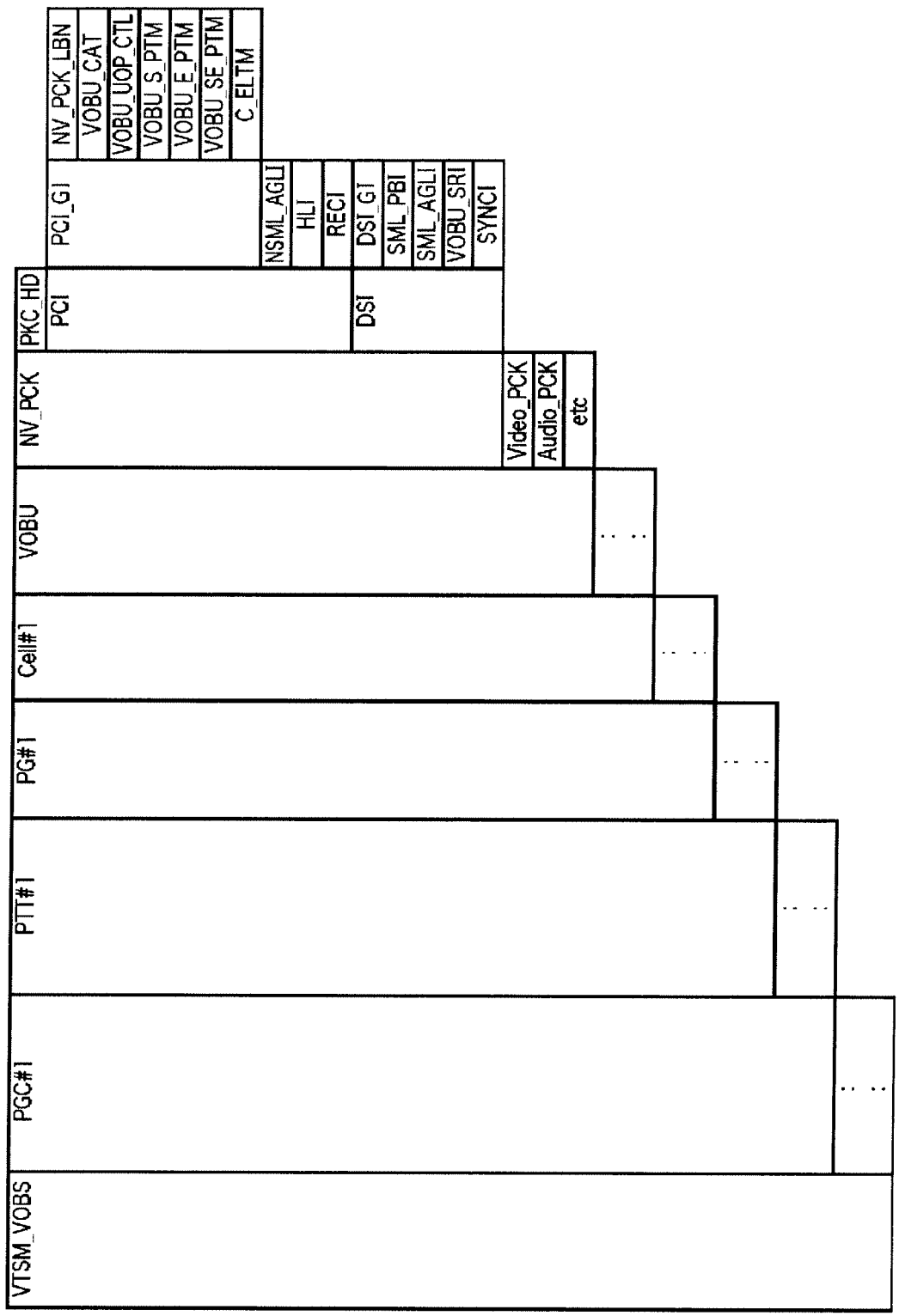
FIG. 16 illustrates VTSM_VOBS.

Next, a description will be given of the VTSM_VOBS (VTS_##_0.VOB) (FIG. 11) of the VTS. The VTSM_VOBS is subdivided as shown in FIG. 16.

That is, the PGC number (PGC#), the PTT number (PTT#), the program number (PG#), the cell number (cell#), and the like are hierarchically described in such a manner as to correspond to the data structure shown in FIG. 9.

The cell is formed of one or more VOBUs. One VOBU has a playback time length of 0.4 to 1 second. As shown in FIG. 16, at the beginning thereof, the NV_PCK is typically placed, and following it, video data, audio data, subpicture data, and the like, which are packed for an integral number of GOPs (Group of Pictures), are inserted on a time-division basis (Video_PCK, Audio_PCK).

One NV_PCK (Navigation Pack) typically exists in the VOBU, and it is located at the beginning of the VOBU. The NV_PCK contains two packets of PCI (Presentation Control Information) and DSI (Data Search Information).

In the PCI, control information on playback display is stored.

The PCI is formed of PCI_GI, NSML_AGLI, HLI, and RECI.

The PCI_GI (PCI general information) is formed of NV_PCK_LBN, VOBU_CAT, VOBU_UOP_CTL, VOBU_S_PTM, VOBU_E_PTM, VOBU_SE_PTM, and C_ELTM.

The NV_PCK_LBN indicates the LBN (logical block number) of the navigation pack. The VOBU_CAT indicates the category (description of analog protection state) of the VOBU. The VOBU_UOP_CTL indicates the user operation control information on the VOBU. The VOBU_S_PTM indicates the start PTM (Presentation Time) of the VOBU. The VOBU_E_PTM indicates the end PTM of the VOBU. The VOBU_SE_PTM indicates the end PTM at the sequence end in the VOBU.

The C_ELTM indicates an elapsed time in the cell. For example, when the playback time of the VOBU of the VOBU#3 in FIG. 15 is 0.5 seconds, the playback time of the VOBU of the VOBU#4 is 0.5 seconds, the playback time of the VOBU of the VOBU#5 is 0.5 seconds, the playback time of the VOBU of the VOBU#6 is 0.5 seconds and when, as a result, the playback time of the cell of the result Cell#2 is 2 seconds, the C_ELTM of the VOBU of the VOBU#3 becomes 0 seconds, the C_ELTM of the VOBU of the VOBU#4 becomes 0.5 seconds, the C_ELTM of the VOBU of the VOBU#5 becomes 1.0 seconds, and the C_ELTM of the VOBU of the VOBU#6 becomes 1.5 seconds.

In an actual DVD video, for example, in the case of a movie, the playback time of one cell is several minutes to a little over 10 minutes, and the playback time of one VOBU is approximately 0.5 to 1 second.

Referring back to FIG. 16, the NSML_AGLI (nonseamless angle information) is information on a destination address when an angle is to be changed.

The HLI (highlight information) is information for highlighting one rectangular area within a subpicture display area.

The RECI (recording information) is information for video data, all audio data, and SP data recorded in this VOBU.

The DSI (data search information) is formed of DSI_GI, SML_PBI, SML_AGLI, VOBU_SRI, and SYNCI.

The DSI_GI (DSI general information) indicates information on the DSI. The SML_PBI (seamless playback information) indicates information necessary for performing seamless playback. The SML_AGLI (seamless angle information) indicates information on a destination address when the angle is to be changed. The VOBU_SRI (VOBU search information) indicates the beginning address of the VOBU that is played back 0.5×n seconds after or before the time at which the VOBU in which the DSI is contained is started to be played back. The SYNCI (synchronization information) indicates the address information of audio data and subpicture data that are reproduced in synchronization with the video data of the VOBU in which the DSI is contained.

Figure 17:
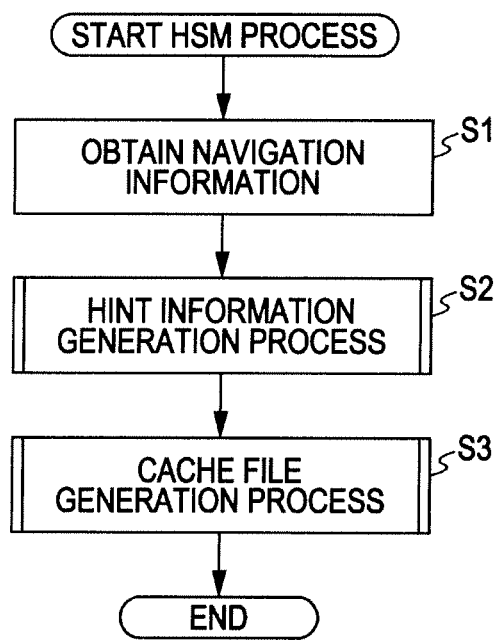
FIG. 17 is a flowchart illustrating an HSM process.

Next, a description will be given, with reference to the flowchart in FIG. 17, of the operation of the recording and playback system 101 when a cache file is to be created.

In step S1, the application program 141 obtains, from the drive 118 into which DVD 119 is loaded, navigation information, which is information for realizing functions unique to a DVD, such as multi-angle playback, parental playback, and random shuffle playback, and for supporting special playback such as fast forwarding and fast rewinding, and supplies the information to the HSM 113 via the storage manager 114. The application program 141 supplies the resume-stopped or bookmarked position (the playback time from the beginning of the content (hereinafter referred to as a "specified time")) to the HSM 113.

In step S2, the migration file system 164 of the HSM 113 generates hint information corresponding to the specified time on the basis of the supplied navigation information.

In step S3, the storage manager 114 generates a cache file on the basis of the generated hint information.

Figure 18:
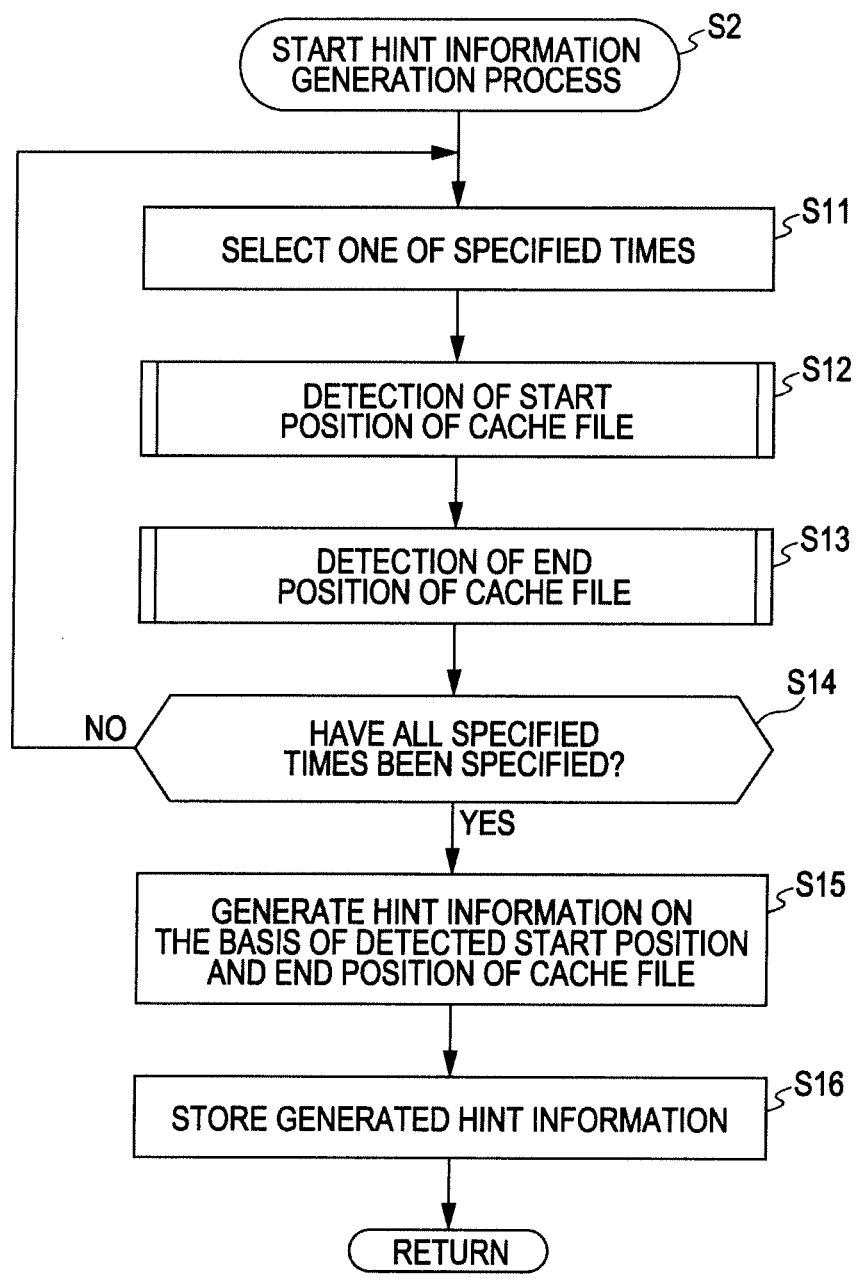
FIG. 18 is a flowchart illustrating a hint information generation process of step S2 of FIG. 17.

Next, details of processing of steps S2 and S3 will be described below. First, a description will be given below, with reference to the flowchart in FIG. 18, of details of a hint information generation process in step S2.

In step S11, the migration file system 164 selects one of the specified times (the playback time from the beginning of the content at the playback time from the beginning of the content). For example, when two places are specified as bookmarks as shown in FIG. 7C, one specified time among them is selected.

Figure 19:
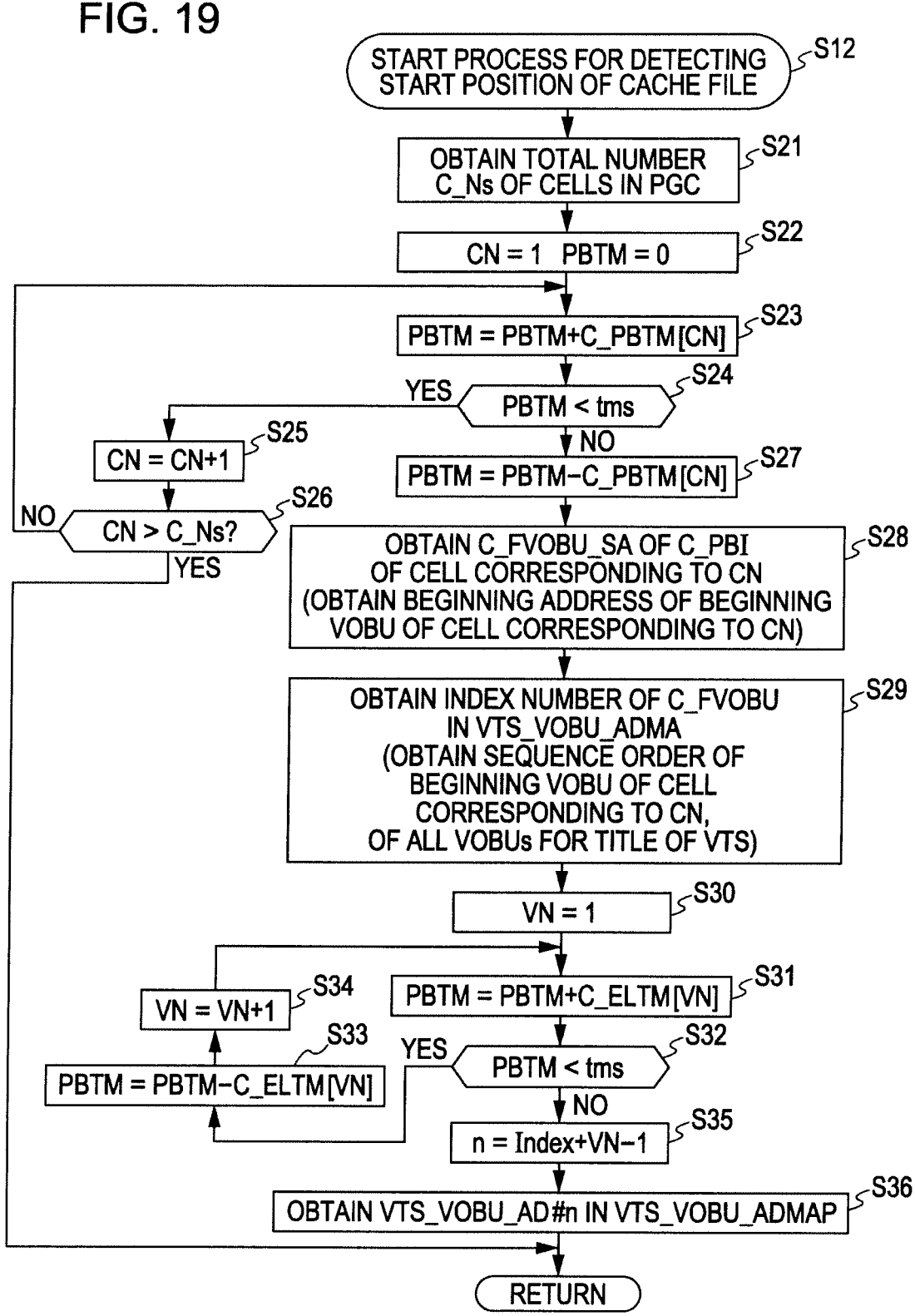
FIG. 19 is a flowchart illustrating a start position detection process of step S11 of FIG. 18.

In step S12, the migration file system 164 detects the start position of the data of the content stored as a cache file in the HDD 116, which corresponds to the specified time selected in step S11. That start position is detected by utilizing navigation information already on the disc. The details of this processing are described in the flowchart shown in FIG. 19.

In step S21, the migration file system 164 reads the total number C_Ns of cells in the PGC from the PGC_GI (FIG. 13) of each PGCI of the VTS_PGCIT of the VTSI obtained as the navigation information. In the PGC_GI (PGC General Information), the overall information on the total number of programs (PGs) in the PGC, the total number of cells, the PGC playback time, and the start addresses of various kinds of tables for the PGC is described.

In step S22, the migration file system 164 sets the counter CN for counting the number of cells to 1 and initializes the value of the counter PBTM for counting the integration time of the playback time of the cells to 0.

In step S23, the migration file system 164 refers to the C_PBTM (C_PBTM[CN]) (FIG. 13) of the C_PBI corresponding to a cell that is played back in the order of the value set to the counter CN in the PGCI in order to obtain the playback time of the cell, and adds the playback time to the counter PBTM. As described above, the C_PBI defines the order in which the cells in the PGC are played back, and in the C_PBTM, the cell playback time is described.

In step S24, the migration file system 164 determines whether or not the value of the counter PBTM (the playback time from the beginning of the content) is smaller than a specified time tms obtained in step S11. When the value is determined to be smaller, the process proceeds to step S25, where the value of the counter CN is incremented by 1.

In the subsequent step S26, the migration file system 164 determines whether or not the value of the counter CN is greater than the total number C_Ns of cells. When the value is determined to be not greater, the process returns to step S23, and processings of step S23 and subsequent steps are performed similarly.

When it is determined in step S24 that the value of the counter PBTM is not smaller than the specified time tms, that is, when the VOBU as the start position of the cache file exists in the cell in which integration was performed last, the process proceeds to step S27, where the migration file system 164 subtracts the playback time (C_PBTM[CN]) of the cell that is played back in the order of the current value of the counter CN from the current value of the counter PBTM.

Figure 20:
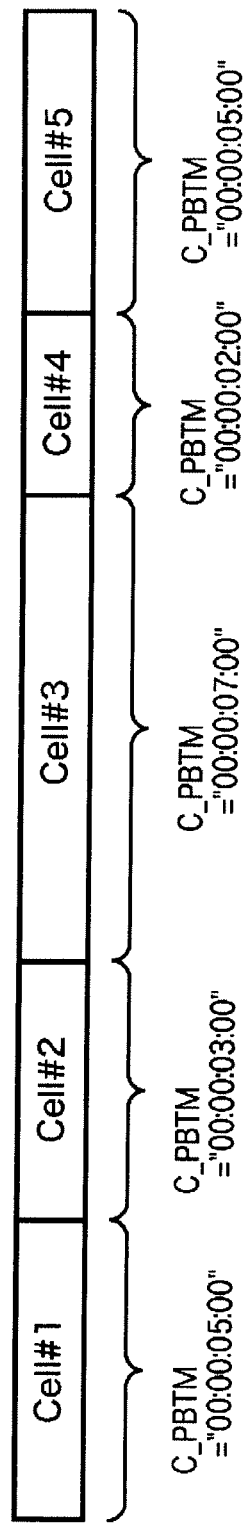
FIG. 20 illustrates another structure of cells.

When the cell playback time of cell#1 to cell#5 is as shown in FIG. 20 and when the specified time is 11:00, the counter BTM (15:00=5:00+3:00+7:00) when the C_PBTMs of cell#1, cell#2, and cell#3 are integrated >11:00. Therefore, the process proceeds to step S27, where the value of the counter PBTM is set to 8:00 (=15:00−7:00).

In the subsequent step S28, the migration file system 164 refers to the C_FVOBU_SA of the C_PBI corresponding to the cell that is played back in the order of the value of the counter CN in order to obtain the beginning address of the beginning VOBU of the cell. The C_PBIT defines the order in which the cells in the PGC are played back, and in the C_FVOBU_SA of the C_PBI, the beginning address of the beginning VOBU of the cell is described.

In the example of FIG. 20, the C_FVOBU_SA of the C_PBI of the cell#3 is referred to, and the beginning address of the beginning VOBU of the cell of cell#3 is obtained.

In step S29, on the basis of the address obtained in step S28, the migration file system 164 obtains an index number (the value of n of the VTS_VOBU_AD#n) of the C_FVOBU in the VTS_VOBU_ADMAP (FIG. 13) of the VTSI, of the VOBU. The VTS_VOBU_ADMAP indicates a table in which the beginning addresses of all the VOBUs for the titles of the VTS are written, and the beginning addresses of all the VOBUs are described in ascending order of the LBN thereof. The VTS_VOBU_AD #n indicates the beginning address of the n-th VOBU in the VTS_VOBU_ADMAP.

In step S30, the migration file system 164 initializes the counter VN to 1.

In step S31, in the cell that is played back in the order of the counter CN, the migration file system 164 refers to the C_ELTM (FIG. 16) of the PCI_GI of the NV_PCK of the VOBU (for example, when NV=1, the VOBU played back first in the cell) that is played back in the order indicated by the value of the counter VN in order to obtain an elapsed time in the cell of the VOBU, and adds the elapsed time to the counter PBTM. In the C_ELTM of the PCI of the NV_PCK, the elapsed time in the cell is described.

In step S32, the migration file system 164 determines whether or not the value of the counter PBTM is smaller than the specified time tms. When the value is determined to be smaller, the process proceeds to step S33, where the elapsed time in the cell of the VOBU played back in the order indicated by the value of the counter VN is subtracted from the counter PBTM (that is, the value of the counter PBTM is returned to the original).

Thereafter, in step S34, the migration file system 164 increments the value of the counter VN by 1. The process then returns to step S31, and processings of step S31 and subsequent steps are performed. That is, the elapsed time up to the VOBU that is played back in the order indicated by the value of the counter VN incremented by 1 is added to the counter PBTM. It is then determined whether the resulting playback time from the beginning of the content up to the VOBU is smaller than the specified time tms.

When it is determined in step S32 that the value of the counter PBTM is not smaller than the specified time tms, the process proceeds to step S35.

When the cell of cell#3 in the example of FIG. 20 is composed of VOBUs, the value of the counter PBTM before the C_ELTM is added is 8:00 (=5:00+3:00). Therefore, when the C_ELTM (=3:00) of the VOBU of VOBU#m is added, the value of the counter PBTM becomes 11:00. Since the value is not smaller than the specified time tms (=11:00), the process proceeds to step S35.

In step S35, the migration file system 164 adds the value obtained by subtracting 1 from the value of the counter VN to the index number obtained in step S29. In step S36, the migration file system 164 obtains, as the start position of the cache file, the VTS_VOBU_AD #n (the beginning address of the n-th VOBU in the VTS_VOBU_ADMAP) in which the resulting value is set as a value of n.

Figure 21:
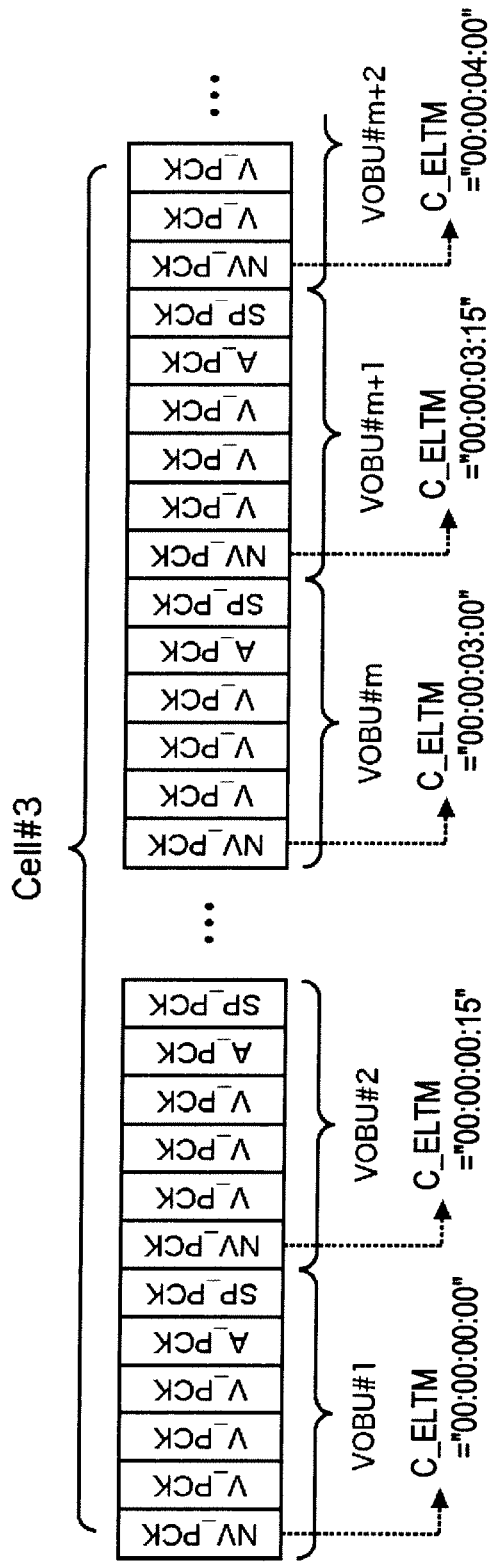
FIG. 21 illustrates the structure of a VOBU.

In the case of the example of FIG. 21, VTS_VOBU_AD #n (the beginning address of the n-th VOBU in the VTS_VOBU_ADMAP) in which the value such that m−1 is added to the index number of the VOBU#1 of the cell of cell#3 is the value of 1 is obtained as the beginning position of the cache file.

When the beginning position of the cache file corresponding to the specified time tms is detected in the manner described above, the process proceeds to step S13 of FIG. 18.

When it is determined in step S26 that the value of the counter CN is greater than the total number C_Ns of cells, the process ends by assuming that a specified time violation has occurred.

Figure 22:
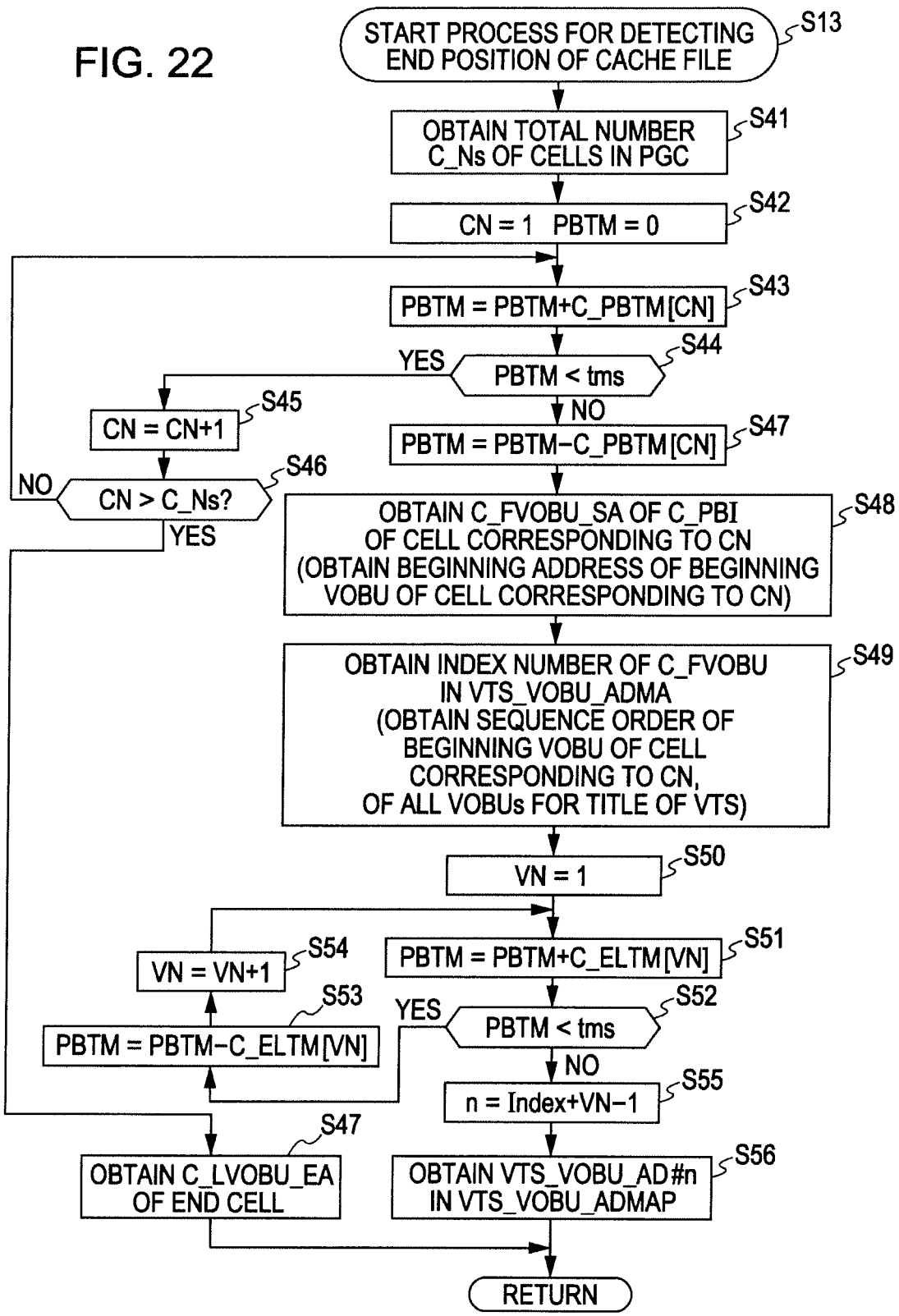
FIG. 22 is a flowchart illustrating an end position detection process of step S13 of FIG. 18.

In step S13, the end position of the data stored as a cache file in the HDD 116, which corresponds to the specified time selected in step S11, is detected. The details of this processing are described in the flowchart of FIG. 22. In the case of this example, the start address of the VOBU to be played back shortly after an elapse of T seconds from the specified time selected in step S11 is determined as the end position of the cache file.

In step S41, the migration file system 164 reads the total number C_Ns of cells in the PGC from the PGC_GI (FIG. 13) of each PGCI of the VTS_PGCIT of the VTSI obtained as the navigation information.

In step S42, the migration file system 164 sets the counter CN for counting the number of cells to 1 and initializes the value of the counter PBTM for counting the integration time of the playback time of the cells to 0.

In step S43, the migration file system 164 refers to the C_PBTM (C_PBTM[CN]) (FIG. 13) of the C_PBI corresponding to a cell that is played back in the order of the value set to the counter CN in the PGCI in order to obtain the playback time of the cell, and adds the playback time to the counter PBTM. As described above, the C_PBI defines the order in which the cells in the PGC are played back, and in the C_PBTM, the cell playback time is described.

In step S44, the migration file system 164 determines whether or not the value of the counter PBTM (the time from the beginning of the content) is smaller than a time tme, which has elapsed by a predetermined time T from the specified time tms obtained in step S11. When the value is determined to be smaller, the process proceeds to step S45, where the value of the counter CN is incremented by 1.

In the subsequent step S46, the migration file system 164 determines whether or not the value of the counter CN is greater than the total number C_Ns of cells. When the value is determined to be not greater, the process returns to step S43, and processings of step S43 and subsequent steps are performed similarly.

When it is determined in step S44 that the value of the counter PBTM is not smaller than the specified time tme, that is, when the VOBU as the end position of the cache file exists in the cell in which integration was performed last, the process proceeds to step S47, where the migration file system 164 subtracts the playback time (C_PBTM[CN]) of the cell that is played back in the order of the current value of the counter CN from the current value of the counter PBTM.

In the subsequent step S48, the migration file system 164 refers to the C_FVOBU_SA of the C_PBI corresponding to the cell that is played back in the order of the value of the counter CN in order to obtain the beginning address of the beginning VOBU of the cell, of the C_PBIT. The C_PBIT defines the order in which the cells in the PGC are played back, and in the C_FVOBU_SA of the C_PBI, the beginning address of the beginning VOBU of the cell is described.

In step S49, on the basis of the address obtained in step S48, the migration file system 164 obtains an index number (the value of n of the VTS_VOBU_AD#n) of the C_FVOBU in the VTS_VOBU_ADMAP (FIG. 13) of the VTSI, of the VOBU. The VTS_VOBU_ADMAP indicates a table in which the beginning addresses of all the VOBUs for the titles of the VTS are written, and the beginning addresses of all the VOBUs are described in ascending order of the LBN thereof. The VTS_VOBU_AD #n indicates the beginning address of the n-th VOBU in the VTS_VOBU_ADMAP.

In step S50, the migration file system 164 initializes the counter VN to 1.

In step S51, in the cell having the value of the counter CN as the cell number, the migration file system 164 refers to the C_ELTM (FIG. 16) of the PCI_GI of the NV_PCK of the VOBU (for example, when NV=1, the VOBU played back first in the cell) that is played back in the order indicated by the value of the counter VN in order to obtain an elapsed time in the cell of the VOBU, and adds the elapsed time to the counter PBTM. In the C_ELTM of the PCI of the NV_PCK, the elapsed time in the cell is described.

In step S52, the migration file system 164 determines whether or not the value of the counter PBTM is smaller than the specified time tme. When the value is determined to be smaller, the process proceeds to step S53, where the elapsed time in the cell of the VOBU played back in the order indicated by the value of the counter VN is subtracted from the counter PBTM (that is, the value of the counter PBTM is returned to the original).

Thereafter, in step S54, the migration file system 164 increments the value of the counter VN by 1. The process then returns to step S51, and processings of step S51 and subsequent steps are performed. That is, the elapsed time up to the VOBU that is played back in the order indicated by the value of the counter VN incremented by 1 is added to the counter PBTM. It is then determined whether the resulting playback time from the beginning of the content is smaller than the specified time tme.

When it is determined in step S52 that the value of the counter PBTM is not smaller than the specified time tme, the process proceeds to step S55.

In step S55, the migration file system 164 adds the value obtained by subtracting 1 from the value of the counter VN to the index number obtained in step S49. In step S56, the migration file system 164 obtains, as the end position of the cache file, the VTS_VOBU_AD #n (the beginning address of the n-th VOBU in the VTS_VOBU_ADMAP) in which the resulting value is set as a value of n.

When it is determined in step S46 that the value of the counter CN is greater than the total number C_Ns of cells, the process returns to step S47, where the address of the C_FVOBU_EA of the end cell is obtained as the end position of the cache file.

When reaching the end position of the cache file corresponding to the specified time tms specified in step S11 in the manner described above, the process proceeds to step S14 of FIG. 18.

In step S14, the migration file system 164 determines whether or not all the specified times have been selected. When a start position that has not yet been selected remains, the process returns to step S11, where the next specified time is selected, and the start position and the end position of the cache file, which correspond to the specified time, are detected.

When it is determined in step S14 that all the specified times have been selected, the process proceeds to step S15, where the migration file system 164 generates hint information on the basis of the start position and the end position of data (hereinafter referred to as a "hint section") stored as the detected cache file.

More specifically, the migration file system 164 sets, as a hint offset, the amount of data from the beginning of the data of the content up to the start position detected in step S12. That is, the hint offset indicates the start position of the hint section by using an offset from the beginning of the data of the content. For example, the unit of the hint offset is set as the amount of data (bytes, etc.).

Figure 23:
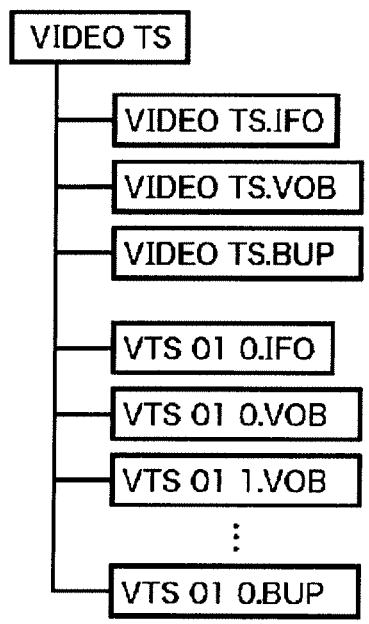
FIG. 23 shows a file structure.

When a file structure identical to that of the DVD-Video standard shown in FIG. 23 is stored in the HDD 116, it is necessary to analyze which file in a DVD disc each of the start position and the end position of the detected hint section belongs to and it is necessary to convert the values of the start address and the end address into the offset values from the beginning of the corresponding file.

Figure 24:
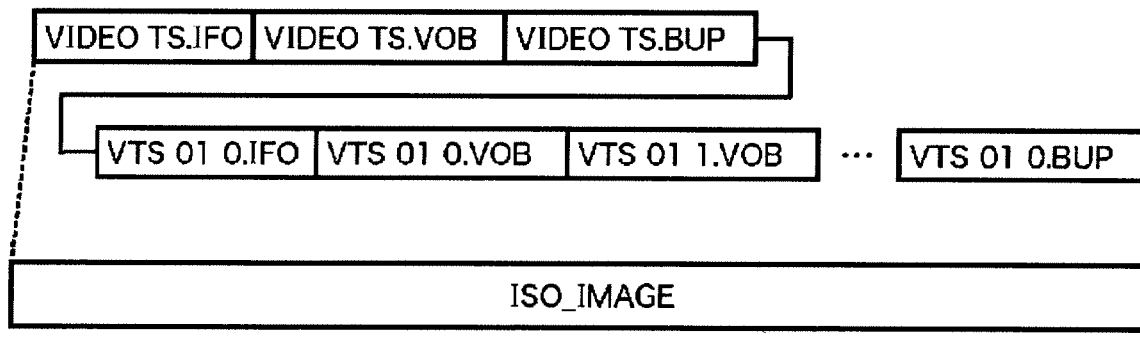
FIG. 24 shows another file structure.

As shown in FIG. 24, when the data on the DVD disc is to be placed as an ISO image in the HDD 116, the start logical address of the ISO image is 0. Therefore, it is necessary to obtain the offset from the beginning of the ISO image file by obtaining, from the file system, the beginning logical block address of the VTS_VOB of the VTS to which the start address and the end address belong and by adding the beginning logical block address to the start address and the end address, which are obtained in step S12 and step S13.

Furthermore, the migration file system 164 sets the amount of data to be reproduced at time T as a hint size. That is, the hint size indicates the amount of data of the hint section. The unit of the hint size is, for example, set as bytes.

When the hint information is generated in the manner described above, the process proceeds to step S16, where the migration file system 164 stores the generated hint information as expansion attributes of the content of the DVD 119 (FIG. 5).

In the hint information, a value corresponding to operation from the user may be directly set. Alternatively, a value may be written by the application program 141 and also by another program such as the operating system.

Thereafter, the process ends.

Figure 25:
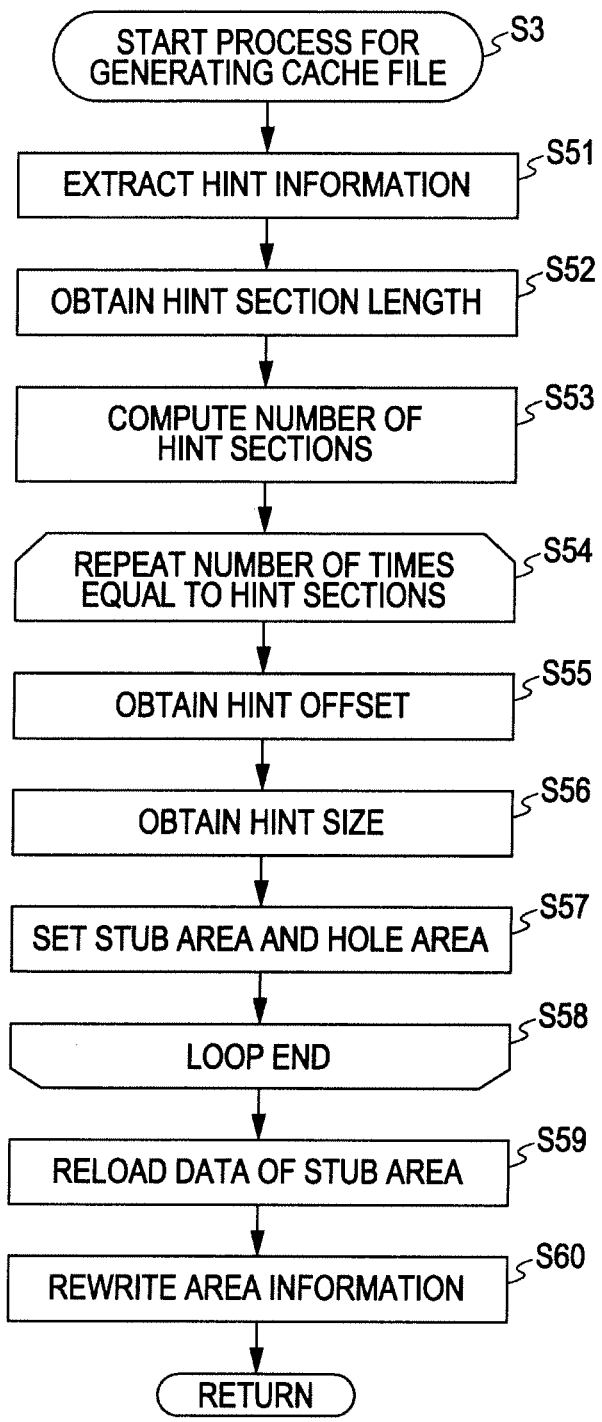
FIG. 25 is a flowchart illustrating a cache file generation process of step S3 of FIG. 17.

Next, a description will be given, with reference to the flowchart in FIG. 25, of the details of a cache file generation process in step S3 of FIG. 17.

In step S51, the storage manager 114 reads the expansion attributes of the content from the migration file system 164, and extracts hint information from the read expansion attributes of the content.

In step S52, the storage manager 114 computes the number of hint sections by obtaining the hint section length, which is the total amount of data of all the hint sections, among the hint information. In step S53, the storage manager 114 computes the number of hint sections by dividing the hint section length by the amount of data of one hint section.

In steps S54 to S58, the storage manager 114 performs processings of steps S55 to S57 with respect to each hint section, and performs a processing of a loop control so that processings of steps S54 to S58 are repeated a number of times equal to the number of hint sections.

In step S55, the storage manager 114 obtains, from the hint information, a hint offset indicating the start position of a predetermined hint section.

In step S56, the storage manager 114 obtains, from the hint information, the hint size indicating the amount of data of the hint section.

In step S57, on the basis of the obtained hint offset and hint size, the storage manager 114 sets the hint section of the content as a stub area (area to be cached) and sets an area where hint information is not set as a hole area.

When processings of steps S54 to S58 are repeated a number of times equal to the number of hint sections and when the stub area and the hole area are set, the process proceeds to step S59.

In step S59, the storage manager 114 allows the HSM 113 to store the data of the stub area in the cache file. The HSM 113 reads the stub area from the drive 118 into which the DVD 119 is loaded and stores the stub area in the cache file of the HDD 116. Reading the data of the content from the DVD 119 and storing the data in the HDD 116 will be referred to as "reloading" as appropriate.

Next, in step S60, the storage manager 114 allows the migration file system 164 of the HSM 113 to rewrite the area information of the expansion attributes of the content in such a manner as to correspond to the result of reloading data into the cache file, and the process is then completed.

In the manner described above, the HSM process is performed (FIG. 17), and the cache file in a stub file state (for example, FIG. 7) is generated.

Figure 26:
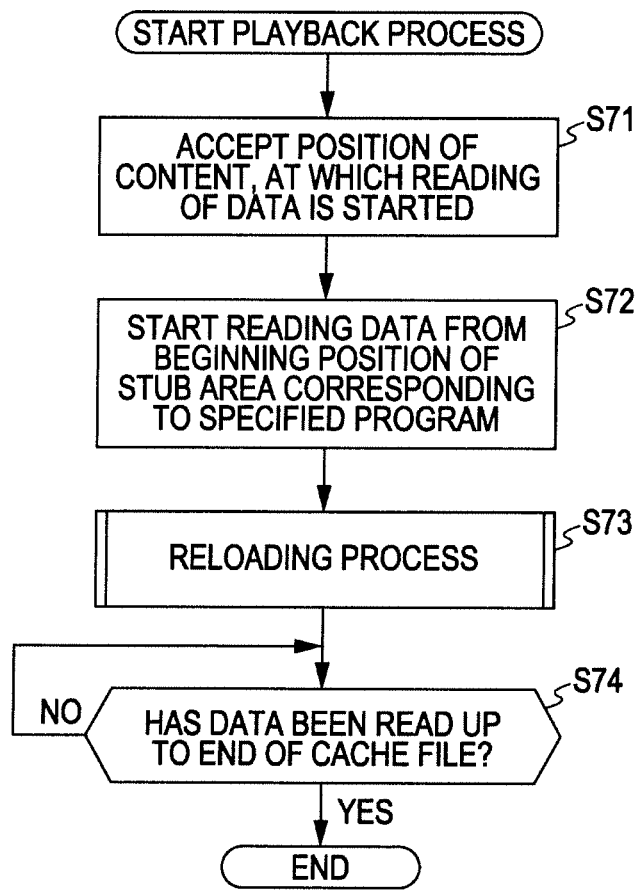
FIG. 26 is a flowchart illustrating a playback process.

Next, a description will be given, with reference to the flowchart in FIG. 26, of a process for reading the data of content (playback process) using a cache file in a stub file state, which is generated in the manner described above.

In step S71, the file I/O manager 163 of the storage manager 114 accepts a selection of a position at which data is begun to be started. In the case of this example, the application program 141 accepts, for example, a selection of a resume-stopped or bookmarked position, which corresponds to operation by the user.

The application program 141 supplies data for specifying the position of content that is to be begun to be played back to the file I/O manager 163. As a result of obtaining the data from the application program 141, the file I/O manager 163 accepts the playback position at which data is begun to be played back. The storage manager 114 instructs the HSM 113 to perform playback from the position.

In step S72, the storage manager 114 instructs the HSM 113 to read the data of the content from the position. The HSM 113 allows the HDD 116 to start reading data from the beginning position of the stub area corresponding to the cache file of the HDD 116.

In step S73, the reloading process is performed.

In step S74, the storage manager 114 determines whether or not data has been read up to the end of the cache file. When it is determined that data has not been read up to the end of the cache file, the process returns to step S74, where the determination process is repeated.

When it is determined in step S74 that the data has been read up to the end of the cache file, the playback process is completed.

Figure 27:
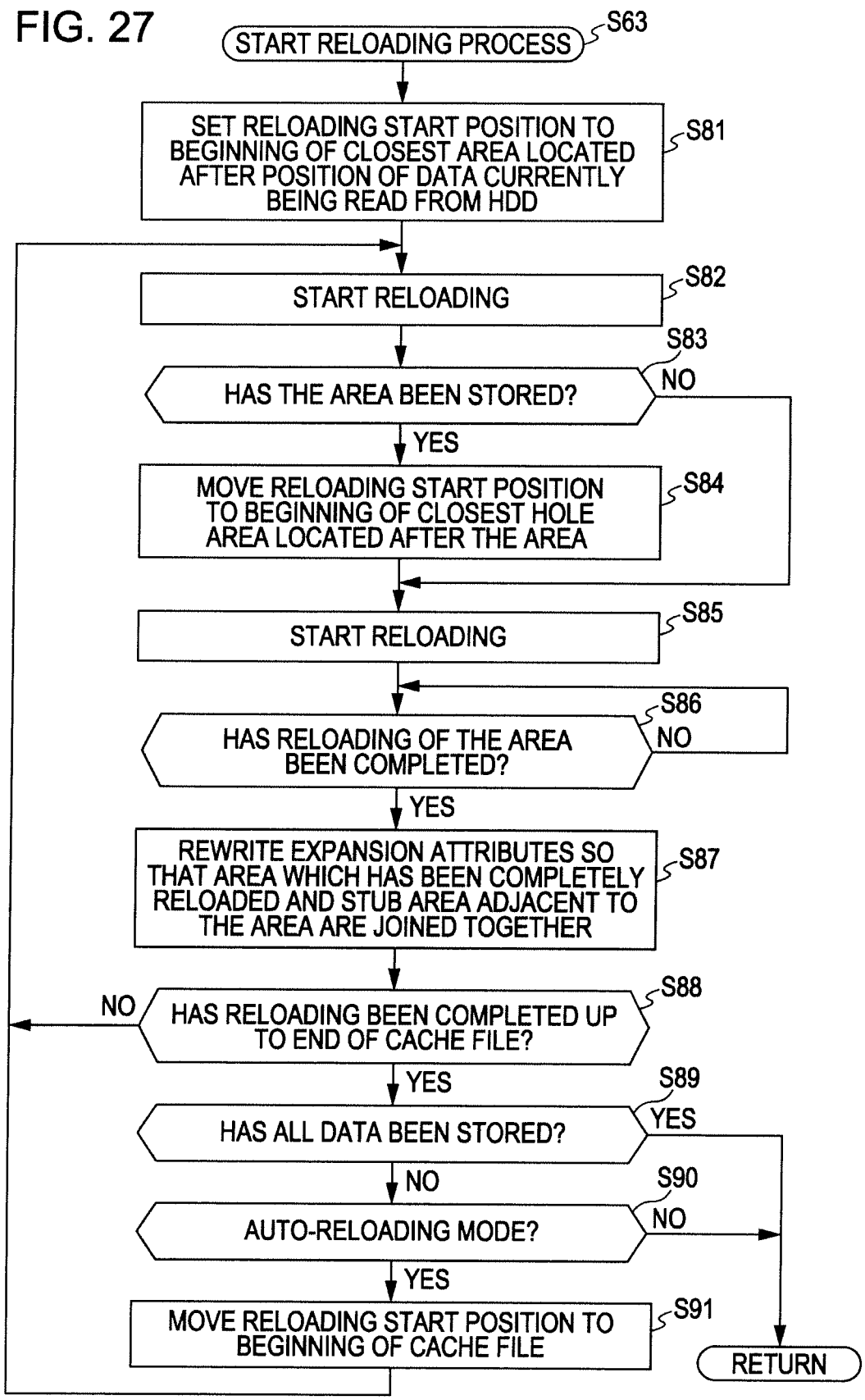
FIG. 27 is a flowchart illustrating a reloading process of step S63 of FIG. 26.

Next, a description will be given, with reference to the flowchart in FIG. 27, of details of the reloading process in step S73.

In step S81, the storage manager 114 instructs the HSM 113 to start reloading by specifying a predetermined position. The migration file system 164 of the HSM 113 sets the reloading start position to the beginning of the closest area located after the position of the data that is currently being read from the HDD 116 in step S72 of FIG. 26.

In step S82, the storage server 165 of the HSM 113 starts reloading. That is, the storage server 165 allows the data at the reloading start position to be read from the drive 118 into which the DVD 119 is loaded and allows the HDD 116 to store the read data so that the read data is stored in a predetermined area of the cache file.

In step S83, the migration file system 164 determines whether or not the area has been stored. When it is determined that the area has been stored, in step S84, the reloading start position is moved to the beginning of the closest hole area located after the predetermined area. When it is determined in step S83 that the predetermined area has not been stored, the process of step S84 is skipped.

In step S85, the storage server 165 of the HSM 113 starts reloading.

In step S86, the migration file system 164 determines whether or not the reloading of the area has been completed. When it is determined that the reloading of the area has not been completed, the process returns to step S86, where the determination process is repeated.

When it is determined in step S86 that the reloading of the area has been completed, the process proceeds to step S87, where the migration file system 164 rewrites the expansion attributes so that the area that has been completely reloaded and the stub area adjacent thereto are joined together.

In step S88, the migration file system 164 determines whether or not the reloading has been completed up to the end of the cache file. When it is determined in step S88 that the reloading has been completed up to the end of the cache file, the process proceeds to step S89, where the migration file system 164 determines whether or not all the data of the content has been stored in the HDD 116.

When it is determined in step S89 that all the data of the content has not been stored, the process proceeds to step S90, where the migration file system 164 determines whether or not the mode is an auto-reloading mode. When it is determined in step S90 that the mode is an auto-reloading mode, the process proceeds to step S91, where the migration file system 164 moves the reloading start position to the beginning of the cache file. The process then returns to step S82, and the above-described processing is repeated.

When it is determined in step S88 that the reloading has not been completed up to the end of the cache file, the process proceeds to step S82, and the above-described processing is repeated.

When it is determined in step S89 that all the data of the content has been stored or when it is determined in step S90 that the mode is not an auto-reloading mode, the process is completed.

Figure 28:
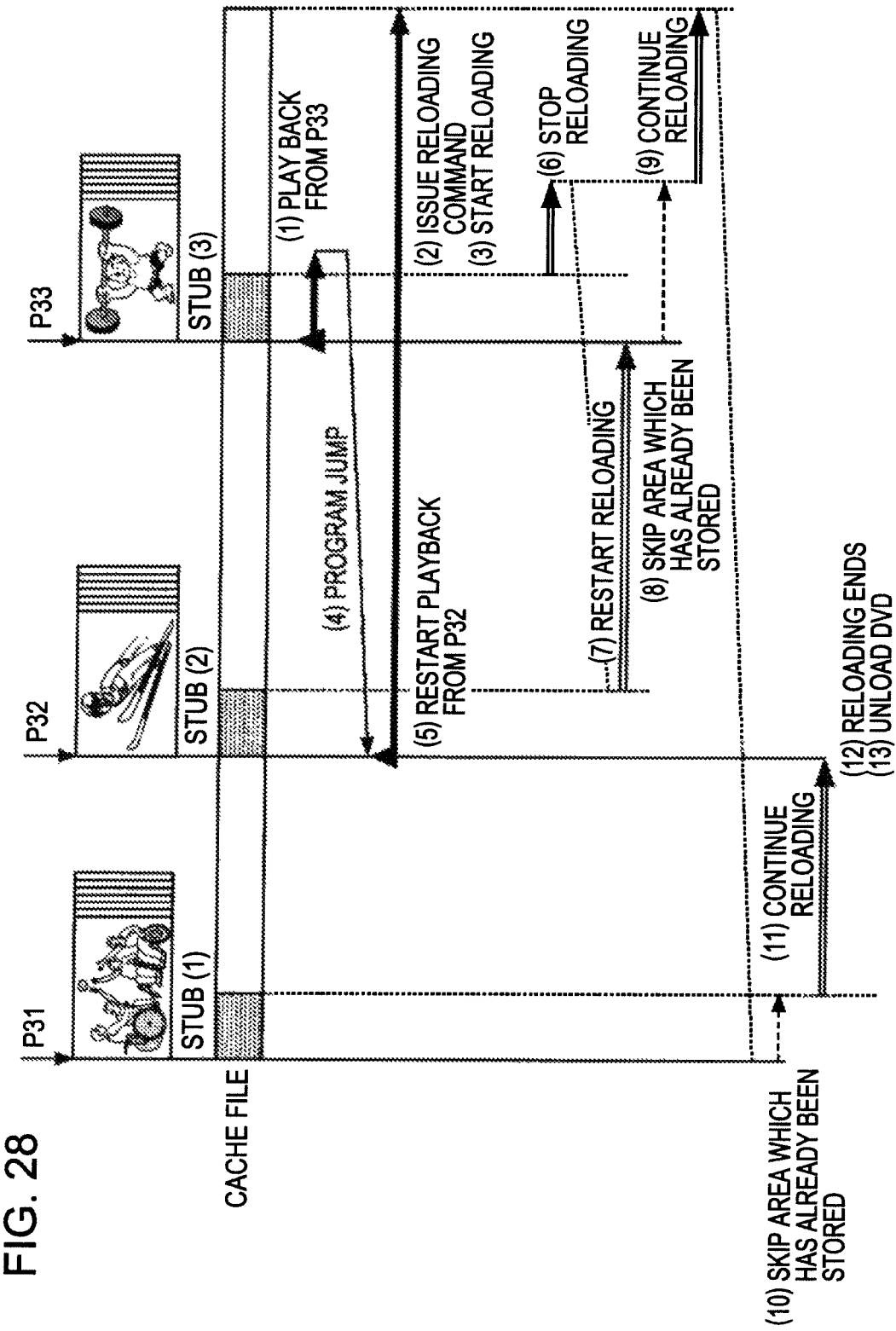
FIG. 28 shows a specific example of a reloading process.
Figure 29:
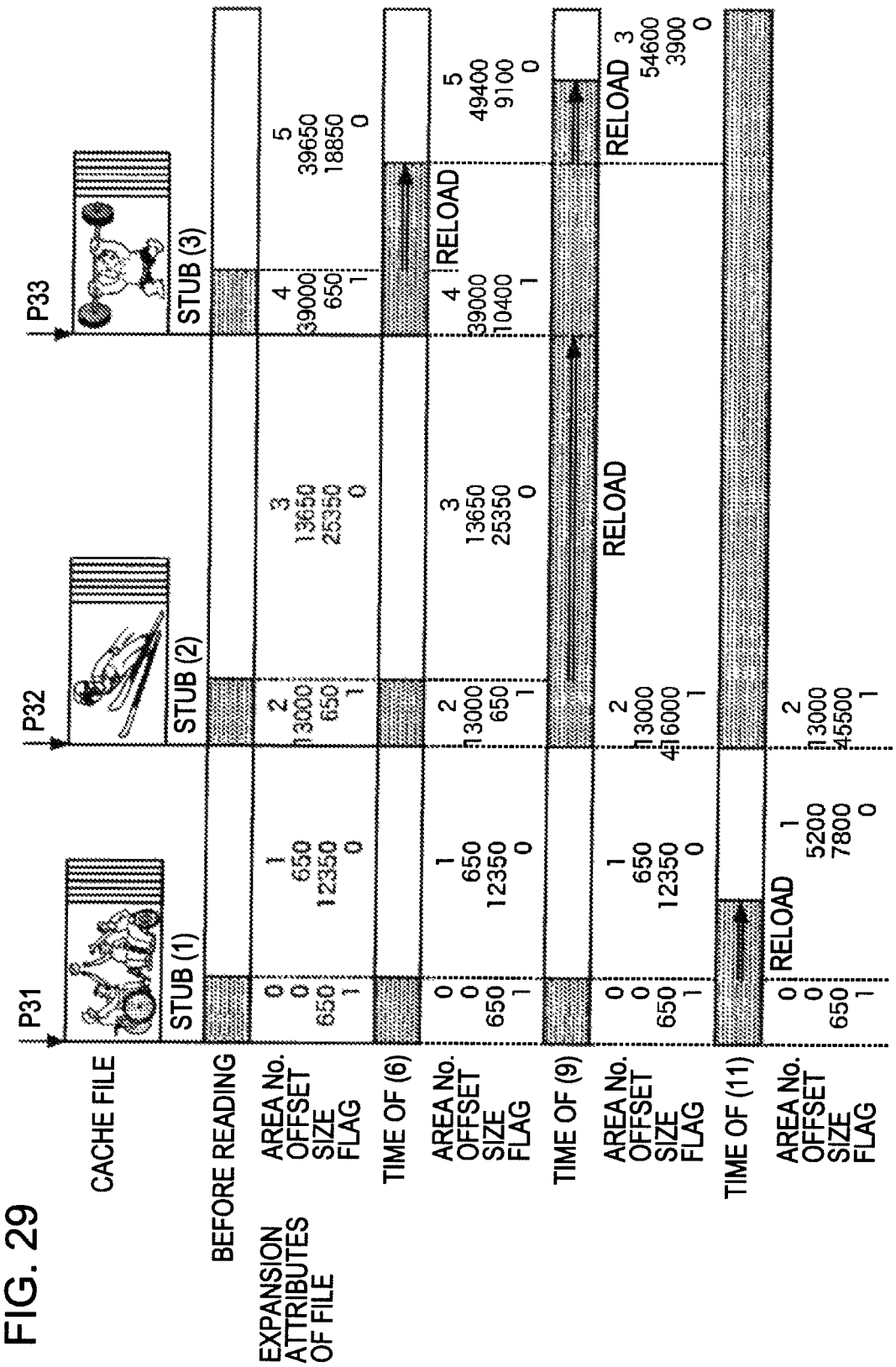
FIG. 29 shows another example of a reloading process.

Next, a specific example of the reloading process will be described below with reference to FIGS. 28 and 29. In the examples of FIGS. 28 and 29, when stub data corresponding to three positions, that is, resume-stopped or bookmarked positions P31 to P33, is stored in a cache file, first, playback from the position P33 is requested. In the middle of the playback, playback from the position P32 is requested, and the playback is performed up to the end of the content.

When playback from the position P33 is requested by operation of the user, the application program 141 accepts the selection of playback from the position P31. First, under the control of the storage manager 114, the HSM 113 allows the HDD 116 to start reading data from the beginning position of the stub area (area whose area number is 4), which corresponds to the cache file at the position P33 of the HDD 116, so that playback from the position P33 is started.

As shown in FIG. 29, with respect to the position P31, the position P32, and the position P33, the stub data of 650 kilobytes of the beginning portion of the content (for program 1), the stub data of 650 kilobytes at a position apart by 13000 kilobytes from the beginning of the content (for program 2), and the stub data of 650 kilobytes at a position apart by 39000 kilobytes from the beginning of the content (for program 3) are stored in the cache file. The data of the other portions of each program are not stored in the cache file.

Stub data of 650 kilobytes in the stub area at the position P33, that is, at the position apart by 39000 kilobytes from the beginning of the content, is read from the HDD 116, and the playback from the beginning of the position P33 is instantly started.

In parallel with the above process, secondly, the storage manager 114 issues, to the HSM 113, a reloading command for requesting the HSM 113 to read the data of the hole area located after the stub area from the position P33 (area 5) from the DVD 119 to the HDD 116 and to store the data in the HDD 116. Then, thirdly, from the DVD 119 loaded into the drive 118, the data of the content corresponding to the data of the hole area (the area whose area number is 5) located after the stub area from the position P33 is read, and reloading is started so that the read data is stored in the hole area located after the stub area from the position P33, of the cache file of the HDD 116 (in such a manner as to be stored following the stub area from the position P33).

In this case, the data following the stub data of 650 kilobytes at a position apart by 39000 kilobytes from the beginning of the content (area 5 for program 3) is read from the DVD 119 loaded into the drive 118. The read data is reloaded so as to follow the stub data of 650 kilobytes at a position apart by 39000 kilobytes from the beginning of the content. Therefore, the data is sequentially stored starting from the beginning of the area whose area number is 5. In response to the storage of the data, the migration file system 164 updates the expansion attributes so that the stored portion is joined to the area whose area number is 4.

Therefore, as the reloading process progresses, the offset position of the area in a hole state, for which the reloading process is to be performed, shifts toward the back of the content (offset becomes larger), and the size of the area becomes smaller.

Here, when the position P32 is selected as a position at which playback is to be started, fourthly, the application program 141 jumps to the position P32. Fifthly, under the control of the storage manager 114, the HSM 113 allows the HDD 116 to start reading data from the beginning position of the stub area of the cache file at the position P32 of the HDD 116 (area 2), and the playback from the position P32 is instantly started.

When the position of the reading of the data is changed by the application program 141 in units of a program, reloading is performed starting from the beginning of the hole area closest to the position at which reading is performed among the hole areas after the position at which reading is performed. Therefore, the reloading process that is currently being performed is interrupted, and reloading is restarted from the beginning of the hole area closet to the position at which reading is now to be performed. Even if the position of the reading of the data is changed, when the position at which reloading is currently being performed is the beginning of the hole area closest to the position at which reading is performed among the hole areas after the changed position at which reading is performed, the reloading process is continued as is.

In this example, since the playback from the position P32 is started, sixthly, the process for reloading the data in the hole area located after the stub area of the position P33 is interrupted.

For example, data of 9750 kilobytes following the stub data of 650 kilobytes at a position apart by 39000 kilobytes from the beginning of the content is read from the DVD 119 loaded into the drive 118. The read data of 9750 kilobytes is reloaded into the hole area so that the data follows the stub data of 650 kilobytes at a position apart by 39000 kilobytes from the beginning of the content. As a result, the amount of data of the stub area at a position apart by 39000 kilobytes from the beginning of the content becomes 10400 (650+9750) kilobytes. The migration file system 164 sets, to 10400, the size of the area indicated by the area number of 4, which is contained in the area information of the expansion attributes of the file.

Seventhly, from the DVD 119 loaded into drive 118, the data of the content corresponding to the data of the hole area located after the stub area from the position P32 is read (area 3). Then, reloading of the data of the content is started so that the read data is stored in the hole area located after the stub area from the position P32 (area 3), of the cache file of the HDD 116.

Eighthly, when the reloading of the hole area located after the stub area from the position P32 is completed, the area that has already been stored is skipped. Ninthly, the reloading process is continued so that reloading of the data in the hole area located after the stub area from the position at which the reloading process was interrupted at the sixth process, that is, from the position P33, is performed.

The data of 25350 kilobytes following the stub data of 650 kilobytes at a position apart by 13000 kilobytes from the beginning of the content is read from the DVD 119 loaded into the drive 118. The read data of 25350 kilobytes is reloaded into the hole area so that the data follows the stub data of 650 kilobytes at a position apart by 13000 kilobytes from the beginning of the content.

As a result, the reloading of the hole area next to the stub area in which the stub data of 650 kilobytes at a position apart by 13000 kilobytes from the beginning of the content is stored is completed. Therefore, the data from a position apart by 13000 kilobytes from the beginning of the content up to a position apart by 49400 kilobytes from the beginning of the content is stored in the cache file. As a result, the stub area having an area number of 2, the stub area having an area number of 3, and the stub area having an area number of 4, which have been adjacent to each other thus far, are joined to one stub area.

The area number of each area is re-assigned to a consecutive value starting from 0 of the beginning area. As a result, the area number of the joined stub area is set to 2, and the area number of the hole area whose area number has been 5 until the areas are joined is set to 3.

As a result of the joining of the areas, the amount of data of the stub area whose area number is 2 becomes 36400 (650+ 25350+10400) (at time of (11)). The migration file system 164 sets the size of the area having an area number of 2, which is contained in the area information of the expansion attributes of the file, to 364000, sets the offset with respect to the area having an area number of 3 to 494000, sets the size to 9100, and sets the flag to 0.

Reloading of the data of the hole area located after the stub area from the position P33, that is, the data of the area whose area number has become 3 as a result of the joining of the areas, is performed. When the data of the content has been reloaded up to the end of the data of the content, the area having an area number of 2 and the area having an area number of 3 are joined together.

In the auto-reloading mode, when reloading is performed up to the end of the data of the content, the remaining data from the beginning, which is not reloaded, is reloaded to the cache file, and the reloading is completed. Therefore, the position of the reloading is moved to the beginning of the cache file. Tenthly, the stored area of the beginning of the content is skipped. Eleventhly, the reloading process is continued so that reloading of the data of the hole area located after the stub area from the position P31 of the beginning of the content is performed.

As shown in FIG. 29, the data following the stub data of 650 kilobytes at the beginning of the content is read from the DVD 119 loaded into the drive 118, and the read data is reloaded to the next hole area of the stub data at the beginning of the content.

Twelfthly, when the data is stored in the cache file up to immediately before the stub area from the position P32, the data of the whole content is stored in the cache file. As a consequence, the reloading is completed. In this case, all the areas are joined into one area.

Thirteenthly, the DVD 119 is unloaded from the drive 118 and is returned to the disc slot 121.

As described above, when reading of the content, in which a cache file in a stub file state is stored in the HDD 116, is requested, the data is read from the DVD 119, and the read data is stored in the cache file. Then, the data stored in the cache file is read, and the content is played back.

As described above, it is possible to reduce a wait time when any desired portion is to be read.

The data that is not stored in the cache file may be read from the DVD 119, and content may be directly played back from the data read from the DVD 119.

Furthermore, the data of the content is prefetched from the DVD 119 and is stored in the HDD 116. Therefore, the drive 118 can be released earlier when compared to the case in which the data read from the DVD 119 is directly used for playback. That is, the performance of the drive 118, such as high-speed reading of the DVD 119, can be exhibited more sufficiently, and the drive 118 can be used more efficiently.

In the foregoing, a case in which support for the DVD-Video standard is provided is described as an example. In addition, in the case of various kinds of formats (for example, DVD±VR, DVD-Audio, and BD (Blue-ray Disc)) having stream data and playback control information for controlling the playback of the stream data and capable of specifying an address in the stream corresponding to a time on the basis of input time information, the present invention can be applied by only changing the address analysis portion.

The series of processes described above can be carried out not only by hardware but also by software. When the series of processes is to be carried out by software, a program constituting the software is installed from a recording medium onto a computer that is incorporated in specialized hardware or, for example, onto a general-purpose personal computer that can perform various functions by installing various programs thereon.

Figure 30:
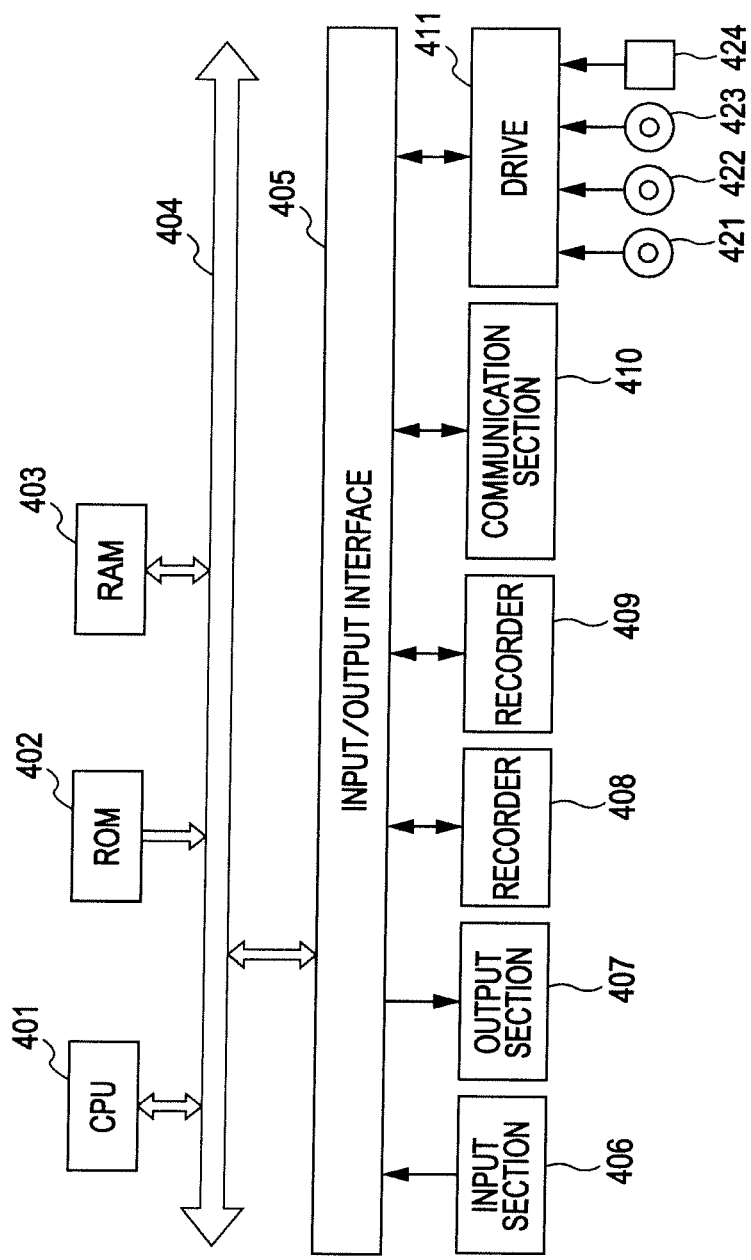
FIG. 30 is a block diagram showing an example of the configuration of a personal computer.

FIG. 30 is a block diagram showing an example of the configuration of a personal computer for performing the above-described series of processes in accordance with a program. A CPU (Central Processing Unit) 401 performs various kinds of processing in accordance with a program stored in a recorder 408 or a recorder 409. In a RAM (Random Access Memory) 403, a program to be executed by the CPU 401, data, and the like are stored as appropriate. The CPU 401, the ROM 402, and the RAM 403 are interconnected with one another via a bus 404.

For the CPU 401, the cell described in "Cell Birth", Nikkei Electronics, Nikkei Business Publications, Inc., Feb. 28, 2005, pp. 89 to 117, can be adopted.

An input/output interface 405 is also connected to the CPU 401 via the bus 404. An input section 406 including a keyboard, a mouse, a microphone, etc., and an output section 407 including a display, a speaker, etc., are connected to the input/output interface 405. The CPU 401 performs various kinds of processings in response to instructions input from the input section 406. Then, the CPU 401 outputs processing results to the output section 407.

The recorder 408 connected to the input/output interface 405 corresponds to, for example, the HDD 116, and records programs to be executed by the CPU 401 and various kinds of data. The recorder 409 corresponds to, for example, the jukebox 145, and records various kinds of data and programs to be executed by the CPU 401. A communication section 410 communicates with external devices of a client or the like via a network, such as the Internet and/or a LAN.

Furthermore, a program may be obtained via the communication section 410 and may be recorded in the recorder 408 or the recorder 409.

When a removable medium, such as a magnetic disk 421, an optical disc 422, a magneto-optical disc 423, or a semiconductor memory 424, is loaded into the drive 411, the drive 411 connected to the input/output interface 405 drives the removable medium in order to obtain a program, data, and the like recorded thereon. The obtained program and data are transferred to the recorder 408 or the recorder 409 as necessary and are recorded therein.

The series of processes described above can be carried out by hardware and also by software. When the series of processes is to be carried out by software, a program constituting the software is installed from a program storage medium into a computer built into specialized hardware or into, for example, a general-purpose personal computer that can carry out various functions by installing various programs thereon.

As shown in FIG. 30, a program storage medium having stored thereon a program that is installed into a computer so as to be a computer-executable state is formed of a removable medium, which is a packaged medium, such as a magnetic disk (including a flexible disk) 421, an optical disc (including a CD-ROM (Compact Disc-Read Only Memory), a DVD (Digital Versatile Disc) 422, or a magneto-optical disc (including an MD (Mini-Disc)) 423, or a semiconductor memory 424, the ROM 402, a hard disk constituting the recorder 408, and the like, in which a program is temporarily or permanently stored. The storage of a program onto the program storage medium is performed as necessary by using a wired or wireless communication medium, such as a local area network, the Internet, and a digital satellite broadcast, via the communication section 410, which is an interface such as a router, a modem, and the like.

In this specification, the operations describing a program stored on the program storage medium include not only processes carried out in time series in the described order but also processes carried out in parallel or individually and not necessarily in time series.

In this specification, the system designates the overall apparatus formed of a plurality of devices.

It should be understood by those skilled in the art that various modifications, combinations, sub-combinations and alterations may occur depending on design requirements and other factors insofar as they are within the scope of the appended claims or the equivalents thereof.

What is claimed is:

1. A reading apparatus for reading data from a digital versatile disc, the reading apparatus comprising:
    specification means for specifying a predetermined position of content read from the digital versatile disc based on a resume-stopping operation indicating the predetermined position input by a user when the content is being read, wherein the user inputs the resume-stopping operation to select any point in time in the content being read from the digital versatile disk as the predetermined position;
    generation means for generating information indicating a predetermined portion of the content from a position specified by the specification means, the predetermined portion being a portion of the content on the digital versatile disc of a predetermined size following the predetermined position;
    storage means for reading the predetermined portion from the digital versatile disc on the basis of the information generated by the generation means and for storing the predetermined portion on a storage medium different from the digital versatile disc when the resume-stopping is input by the user; and reading control means for controlling reading of data from the storage medium and the digital versatile disc based on a resume playback input by the user so that the data of the predetermined portion from the position specified by the specification means, the predetermined portion being stored on the storage medium, is read and data subsequent to the data read from the storage medium is read from the digital versatile disc if reading of the content from the position specified by the specification means is requested.

2. The reading apparatus according to claim 1, wherein the predetermined portion from the position specified by the specification means is a portion of a period of time longer than a period of time necessary for reading data of content from the digital versatile disc.

3. The reading apparatus according to claim 1, wherein the specification means specifies a resume-stopped position as the predetermined position.

4. The reading apparatus according to claim 1, wherein the predetermined portion is detected utilizing navigation information on the digital versatile disc.

5. The reading apparatus according to claim 4, wherein when storing the data on the storage medium, the navigation information is converted into offset values from a beginning of a file of the data.

6. The reading apparatus according to claim 1, wherein storage means includes a hard disc including a cache area into which the predetermined portion is stored as a cache file.

7. A reading apparatus that reads data from a digital versatile disc or a storage medium, the reading apparatus comprising:

a specification section configured to specify a predetermined position of content read from the digital versatile disc based on a resume-stopping operation indicating the predetermined position input by a user when the content is being read, wherein the user inputs the resume-stopping operation to select any point in time in the content being read from the digital versatile disk as the predetermined position;

a controller configured to generate information indicating a predetermined portion of the content from a position specified by the specification section, the predetermined portion being a portion of the content on the digital versatile disc of a predetermined size following the predetermined position;

a storage device configured to read the predetermined portion from the digital versatile disc on the basis of the information generated by the generation section and for storing the predetermined portion on a storage medium different from the digital versatile disc when the resume-stopping is input by the user; and a reading controller configured to control reading of data from the storage medium and the digital versatile disc based on a resume playback input by the user so that the data of the predetermined portion from the position specified by the specification section, the predetermined portion being stored on the storage medium, is read and data subsequent to the data read from the storage medium is read from the digital versatile disc if reading of the content from the position specified by the specification section is requested.

8. The reading apparatus according to claim 7, wherein the predetermined portion from the position specified by the specification section is a portion of a period of time longer than a period of time necessary for reading data of content from the digital versatile disc.

9. The reading apparatus according to claim 7, wherein the specification section specifies a resume-stopped position as the predetermined position.

10. The reading apparatus according to claim 7, wherein the predetermined portion is detected utilizing navigation information on the digital versatile disc.

11. The reading apparatus according to claim 10, wherein when recording the data on the storage medium, the navigation information is converted into offset values from a beginning of a file of the data.

12. The reading apparatus according to claim 7, wherein the storage device includes a hard disc including a cache area into which the predetermined portion is stored as a cache file.

13. A reading method for use with a reading apparatus for reading data from a digital versatile disc, the reading method comprising:

specifying a predetermined position of content read from the digital versatile disc based on a resume-stopping operation indicating the predetermined position input by a user when the content is being read, wherein the user inputs the resume-stopping operation to select any point in time in the content being read from the digital versatile disk as the predetermined position;

generating information indicating a predetermined portion of the content from the position specified in the specification, the predetermined portion being a portion of the content on the digital versatile disc of a predetermined size following the predetermined position;

reading the predetermined portion from the digital versatile disc on the basis of the information generated in the generation and storing the predetermined portion in advance on a storage medium different from the digital versatile disc when the resume-stopping is input by the user; and controlling reading of data from the storage medium and the digital versatile disc based on a resume playback input by the user so that the data of the predetermined portion from the position specified in the specification, the predetermined portion being stored on the storage medium, is read and data subsequent to the data read from the storage medium is read from the digital versatile disc if reading of the content from the position specified in the specification is requested.

14. The reading method according to claim 13, wherein the predetermined portion from the position specified by the specifying is a portion of a period of time longer than a period of time necessary for reading data of content from the digital versatile disc.

15. The reading method according to claim 13, wherein the specifying specifies a resume-stopped position as the predetermined position.

16. The reading method according to claim 13, wherein the predetermined portion is detected utilizing navigation information on the digital versatile disc.

17. The reading method according to claim 16, wherein when storing the data on the storage medium, the navigation information is converted into offset values from a beginning of a file of the data.

18. The reading method according to claim 13, wherein the storage medium includes a hard disc including a cache area into which the predetermined portion is stored as a cache file.

19. A non-transitory computer readable medium including computer executable instructions enabling a computer to perform a reading process for reading data from a digital versatile disc, the computer executable instructions causing a computer to perform operations comprising:

specifying a predetermined position of content read from the digital versatile disc based on a resume-stopping operation indicating the predetermined position input by a user when the content is being read, wherein the user inputs the resume-stopping operation to select any point in time in the content being read from the digital versatile disk as the predetermined position;

generating information indicating a predetermined portion of the content from the position specified in the specification, the predetermined portion being a portion of the content on the digital versatile disc of a predetermined size following the predetermined position;

reading the predetermined portion from the digital versatile disc on the basis of the information generated in the generation and storing the predetermined portion in advance on a storage medium different from the digital versatile disc when the resume-stopping is input by the user; and controlling reading of data from the storage medium and the digital versatile disc based on a resume playback input by the user so that the data of the predetermined portion from the position specified in the specification, the predetermined portion being stored on the storage medium, is read and data subsequent to the data read from the storage medium is read from the digital versatile disc if reading of the content from the position specified in the specification is requested.

20. The non-transitory computer readable medium according to claim 19, wherein the storage medium includes a hard disc including a cache area into which the predetermined portion is stored as a cache file.

* * * * *